(12) United States Patent
Alwon

(10) Patent No.: US 11,105,942 B2
(45) Date of Patent: Aug. 31, 2021

(54) GENERATIVE ADVERSARIAL NETWORK SEISMIC DATA PROCESSOR

(71) Applicant: WesternGeco LLC, Houston, TX (US)

(72) Inventor: Stephen Alwon, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 241 days.

(21) Appl. No.: 16/364,330

(22) Filed: Mar. 26, 2019

(65) Prior Publication Data

US 2019/0302290 A1 Oct. 3, 2019

Related U.S. Application Data

(60) Provisional application No. 62/648,928, filed on Mar. 27, 2018.

(51) Int. Cl.
| | |
|---|---|
| *G01V 1/28* | (2006.01) |
| *G01V 1/36* | (2006.01) |
| *G01V 99/00* | (2009.01) |

(52) U.S. Cl.
CPC .............. *G01V 1/282* (2013.01); *G01V 1/364* (2013.01); *G01V 99/005* (2013.01)

(58) Field of Classification Search
CPC ....... G01V 1/282; G01V 1/364; G01V 99/005
See application file for complete search history.

(56) References Cited

U.S. PATENT DOCUMENTS

| 2018/0164458 A1* | 6/2018 | Sudow ................. G01C 21/165 |
| 2019/0295530 A1* | 9/2019 | Hosseini-Asl .......... G10L 15/07 |

OTHER PUBLICATIONS

Gatys et al., "A Neural Algorithm of Artistic Style," arXiv:1508.06576 (2015) (16 pages).
Goodfellow et al. (2014), "Generative Adversarial Nets," arXiv:1406.2661 (9 pages).
He et al. (2015), "Deep Residual Learning for Image Recognition," arXiv:1512.03385 (12 pages).
Gulrajani et al. (2017), "Improved Training of Wasserstein GANs", arXiv:1704.00028. (20 pages).
Isola et al., "Image-to-Image Translation with Conditional Adversarial Networks," arXiv:1611.07004 (2017) (17 pages).
Ledig et al. (2017) "Photo-Realistic Single Image Super-Resolution Using a Generative Adversarial Network," arXiv:1609.04802 (19 pages).
Arjovsky et al. (2017), "Wasserstein GAN," arXiv:1701.07875 (2 pages).
Radford et al. (2015), "Unsupervised Representation Learning with Deep Convolutional Generative Adversarial Networks," arXiv:1511.06434v2. (16 pages).
Ronneberger et al., "U-Net: Convolutional Networks for Biomedical Image Segmentation," arXiv:1505.04597 (2015) (8 pages).
Shi et al. (2016), "Real-Time Single Image and Video Super-Resolution Using an Efficient Sub-Pixel Convolutional Neural Network," arXiv:1609.05158. (10 pages).

(Continued)

*Primary Examiner* — Manuel A Rivera Vargas
(74) *Attorney, Agent, or Firm* — Michael Guthrie

(57) ABSTRACT

A method can include generating seismic data; training a generator network utilizing at least a portion of the generated seismic data and a discriminator network; and outputting a trained generator network.

21 Claims, 16 Drawing Sheets

(56) References Cited

OTHER PUBLICATIONS

Yang et al. (2018), "Application of optimal transport and the quadratic Wasserstein metric to full-waveform inversion," Geophysics, 83(1), R43-R62.

Zhu et al., "Unpaired Image-to-Image Translation using Cycle-Consistent Adversarial Networks", arXiv:1703.10593v6 [cs.CV], https://arxiv.org/abs/1703.10593 (submitted on Mar. 30, 2017 (v1) (18 pages).

* cited by examiner

GENERATIVE ADVERSARIAL NETWORK SEISMIC DATA PROCESSOR

RELATED APPLICATION

This application claims priority to and the benefit of a U.S. Provisional Application having Ser. No. 62/648,928, filed 27 Mar. 2018, which is incorporated by reference herein.

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Various techniques described herein pertain to processing of data such as, for example, seismic data.

SUMMARY

A method can include generating seismic data; training a generator network utilizing at least a portion of the generated seismic data and a discriminator network; and outputting a trained generator network. A system can include a processor; memory operatively coupled to the processor; and processor-executable instructions stored in the memory to instruct the system to: generate seismic data; train a generator network utilizing at least a portion of the generated seismic data and a discriminator network; and output a trained generator network. A system can include a processor; memory operatively coupled to the processor; and processor-executable instructions stored in the memory to instruct the system to: access a trained generator network, as trained via generated seismic data and a discriminator network; receive seismic data of a survey of a geologic environment; and process at least a portion of the seismic data utilizing the trained generator network to generate processed data. A method can include accessing a trained generator network, as trained via generated seismic data and a discriminator network; receiving seismic data of a survey of a geologic environment; and processing at least a portion of the seismic data utilizing the trained generator network to generate processed data. One or more computer-readable storage media can include processor-executable instructions to instruct a computing system to: access a trained generator network, as trained via generated seismic data and a discriminator network; receive seismic data of a survey of a geologic environment; and process at least a portion of the seismic data utilizing the trained generator network to generate processed data. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
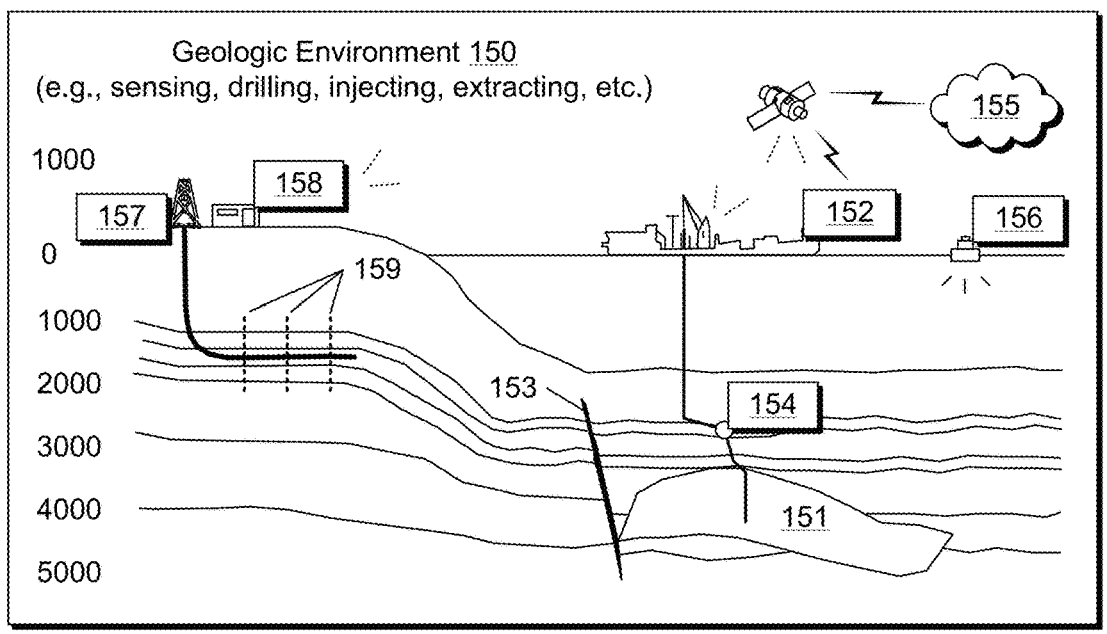
FIG. 1 illustrates an example of a geologic environment and an example of a technique.
Figure 1:
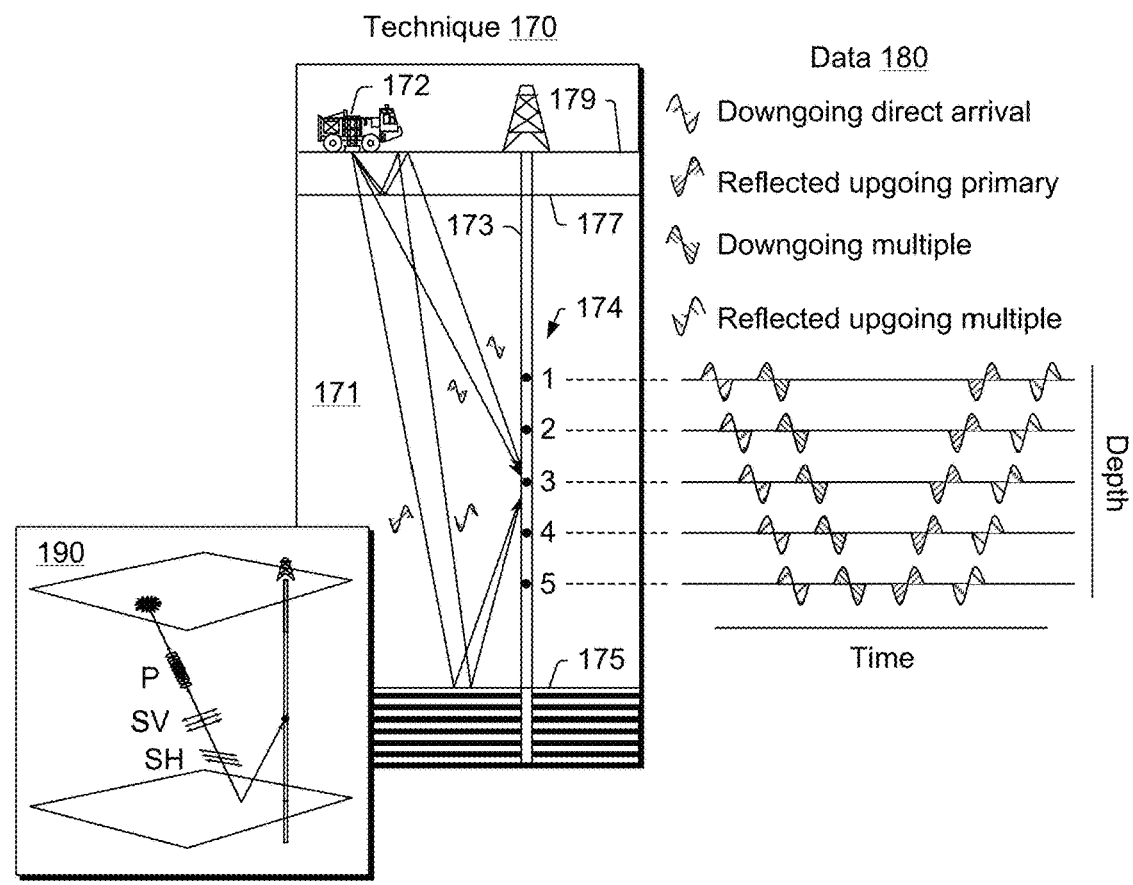

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks.

As an example, a seismic imaging system can be utilized to perform seismic surveys. As an example, consider a land-based survey of a subsurface region where sensors can be positioned according to a survey footprint that may cover an area of square kilometers where one or more seismic energy sources are fired to emit energy that can travel through the subsurface region such that at least a portion of the emitted energy can be received at one or more of the sensors. As another example, consider a marine survey that may involve towing one or more streamers behind a vessel where a streamer includes sensors where one or more seismic energy sources are fired to emit energy that can travel through water and a subsurface region such that at least a portion of the emitted energy can be received at one or more of the sensors. In a survey, noise may be sensed that can be associated with one or more phenomena. For example, ground roll can be a type of noise that can be coherent noise generated by a surface wave (e.g., a low-velocity, low-frequency, high-amplitude Rayleigh wave). Ground roll may obscure signal and degrade overall data quality; noting that selection of source and geophone arrays, filters and stacking parameters may help to reduce the effect of such noise. In a marine environment, water-bottom roll may result in a type of noise. Water-bottom roll can include a pseudo-Rayleigh wave traveling along an interface of water and a seafloor (e.g., seabed). Water-bottom roll may present in a survey that utilizes one or more seabed sensors. Another type of noise is referred to as ghosting. A ghost can be a short-path multiple, or a spurious reflection that occurs when seismic energy initially reverberates upward from a shallow subsurface and then is reflected downward, such as at the base of weathering or between sources and receivers and a water/air interface.

Yet another type of noise can be associated with equipment such as sensor equipment. Such noise may be due to environmental conditions (e.g., temperature, wind, waves, radiation, etc.). As to streamers, noise may occur due to contact with one or more objects. Flotsam and jetsam are terms that describe two types of marine debris. Flotsam is defined as debris in the water that was not deliberately thrown overboard, often as a result from a shipwreck or accident. Jetsam describes debris that was deliberately thrown overboard by a crew of a ship in distress, most often to lighten the ship's load. The word flotsam derives from the French word floter, to float. Jetsam is a shortened word for jettison. Other types of debris can be of natural origin (e.g., wood from trees, etc.) and/or dead/decaying marine life (e.g., fish, plants, etc.).

As to streamers, noise may occur due to vessel factors such as vessel speed, variation in speed, acceleration, waves impacting vessel performance, navigating around icebergs, making turns, etc. For example, where a vessel is to trace a path for a survey, the path can include turns that cause streamers to change in shape, which may cause bending, etc., changes in angles with respect to source originated seismic energy, etc. As vessel operations involves energy expenditure (e.g., liquid fuel, solar power, etc.), a survey may continue during turns of a survey path.

As an example, a streamer cable can be at least partially filled with a material (a fluid, a gel, etc.). An outer tube or jacket may be of the order of a few millimeters thick as to a wall thickness. An outer tube may be constructed of a material or materials that provide integrity while allowing for responsiveness as to sensing. Issues that may arise at sea include shark bites and other physical hazards that may be encountered during towing, storage and deployment.

Streamer cables may be spooled onto drums for storage on a vessel, which subjects the streamer cables to various contact and bending forces, etc. (consider winding and unwinding operations).

A streamer cable may be serviceable in that repairs may be made. Such repairs may be at sea or at a land-based facility. In general, operations aim to avoid or otherwise diminish down time due to expense and costs (vessel, crew, production schedules, etc.). In various geographies, weather may vary and particular conditions, seasons, etc. may cause some amount of uncertainty in scheduling. In some geographies, regular "windows" exist where conditions can be more favorable for performing surveys. As may be appreciated, various factors can result in noise in seismic survey data.

As an example, noise may be subject to attenuation and/or subject to study. For example, attenuation can allow for enhanced signal processing, which can include one or more of transmitting, compressing, reconstructing, interpreting, etc. As to an analysis (e.g., study) of noise, it may provide information as to one or more causes, which may be addressable to reduce noise during and/or after a survey and, for example, before a subsequent survey. For example, consider noise associated with damage to a streamer or a component of a streamer (e.g., guides, fins, etc.). Such damage may present as a particular type of noise that if identified via analysis may allow for quality control and/or remedial measures (e.g., mitigation, data cleansing, data filtering, repair of equipment, etc.).

As an example, a machine can acquire seismic data and can process the seismic data via circuitry of the machine, which can include one or more processors and memory accessible to at least one processor. Such a machine can include one or more interfaces that can be operatively coupled to one or more pieces of equipment, whether by wire or wirelessly (e.g., via wireless communication circuitry). As an example, such a machine may be a seismic imager that can generate an image based at least in part on seismic data. Such an image can be a model according to one or more equations and may be an image of structure of a subterranean environment and/or an image of noise, which may be due to one or more phenomena. As an example, a seismic image can be in one or more types of domains. For example, consider a spatial and temporal domain where one dimension is spatial and another dimension is temporal. Such a domain may be utilized for seismic traces that are amplitude values with respect to time as acquired by a receiver of seismic survey equipment. As an example, time may be transformed to depth or other spatial dimension. In such an example, a seismic image can be in a spatial domain with two spatial dimensions.

An image can be a multidimensional construct that is at least in part seismic data-based. For example, a digital camera of a smartphone can process data acquired by a CCD array utilizing a model such that the model and associated values may be rendered to a display of the smartphone.

In a CCD image sensor, pixels are represented by p-doped metal-oxide-semiconductors (MOS) capacitors. These capacitors are biased above the threshold for inversion when image acquisition begins, allowing the conversion of incoming photons into electron charges at the semiconductor-oxide interface; the CCD image sensor is then used to read out these charges. Instructions executable by a processor of a smartphone can receive the charges as sensor data. Where a CCD is configured to be sensitive to color, it may utilize a Bayer mask over the CCD array where, for example, each square of four pixels has one filtered red, one blue, and two green such that luminance information is collected at every pixel, but the color resolution is lower than the luminance resolution. A color model that can include features of an RGB colorspace model can be utilized by the smartphone to generate data that can be then rendered to a display. Ultimately, the rendering to the display is a model with particular values that depend on the acquired CCD image sensor data.

In seismic imaging, rather than photons, seismic energy is sensed. Further, the amount of data sensed tends to be orders of magnitude greater than that of a digital camera of a smartphone. Yet further, a region "sensed" (e.g., surveyed) is generally not visible to the eye. Various types of models can be utilized for seismic imaging such that, for example, rendering can occur to a display of information that is based at least in part on sensed data.

As an example, a system can include circuitry that can implement one or more generative adversarial networks, or GANs, which are a class of machine learning techniques that involve two networks trained simultaneously to generate a desired outcome. As an example, such a system can perform one or more seismic processing tasks such as, for example, noise attenuation and trace interpolation. As an example, a GAN can be trained such that a generator can generate output, which may be, for example, seismic data (e.g., noise attenuated seismic data, interpolated seismic data, etc.).

As an example, generative adversarial networks (GANs), as a class of networks, can be implemented through use of neural networks working in parallel to generate data that may pass for "real" data. As an example, a GAN can be utilized in a so-called image-to-image process that receives and image and output an image. As an example, a GAN can be utilized in a seismic data-to-seismic data process that receives seismic data and that output seismic data.

As an example, one or more GANs may be trained via unsupervised learning. As an example, a computing system can construct GANs that perform one or more tasks in seismic data processing and imaging. As mentioned, such tasks can include, for example, noise attenuation and interpolation. These two examples tend to involve analyzing data in different domains, which demands expert knowledge for proper parameterization. By utilizing properly trained GANs, a computing system can perform one or both of these processes in a manner that is more automated and less reliant on an end user's parameters. Various other types of processes may be performed using one or more GANs, for example, consider generating seismic data in a particular "style", which may be a noise attenuated "style".

FIGS. 1, 2, 3, 4 and 5 present various examples of equipment and techniques associated with seismic data. One or more of the examples may be utilized in conjunction with one or more GANs. As an example, a computing system may utilize one or more GANs to handle noise, for example, for purposes of attenuation and/or for purposes of diagnosis and one or more actions responsive to one or more diagnoses.

FIG. 1 shows an example of a geologic environment 150 (e.g., an environment that includes a sedimentary basin, a reservoir 151, one or more fractures 153, etc.) and an example of an acquisition technique 170 to acquire seismic data. As an example, a system may process data acquired by the technique 170, for example, to allow for direct or indirect management of sensing, drilling, injecting, extracting, etc., with respect to the geologic environment 150. In turn, further information about the geologic environment 150 may become available as feedback (e.g., optionally as input to the system).

As an example, a system may include features of a commercially available simulation framework such as the PETREL seismic to simulation software framework (Schlumberger Limited, Houston, Tex.). The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

As an example, a system may include add-ons or plug-ins that operate according to specifications of a framework environment. For example, a commercially available framework environment marketed as the OCEAN framework environment (Schlumberger Limited, Houston, Tex.) allows for integration of add-ons (or plug-ins) into a PETREL framework workflow. The OCEAN framework environment leverages .NET tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

In the example of FIG. 1, the geologic environment 150 may include layers (e.g., stratification) that include a reservoir 151 and that may be intersected by a fault 153. As an example, a geologic environment may be or include an offshore geologic environment, a seabed geologic environment, an ocean bed geologic environment, etc.

As an example, the geologic environment 150 may be outfitted with one or more of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL software, for example, that operates on seismic data, seismic attribute(s), etc. As an example, a workflow may be a process implementable in the OCEAN framework. As an example, a workflow may include one or more worksteps that access a module such as a plug-in (e.g., external executable code, etc.).

In FIG. 1, the technique 170 may be implemented with respect to a geologic environment 171. As shown, an energy source (e.g., a transmitter) 172 may emit energy where the energy travels as waves that interact with the geologic environment 171. As an example, the geologic environment 171 may include a bore 173 where one or more sensors (e.g., receivers) 174 may be positioned in the bore 173. As an example, energy emitted by the energy source 172 may interact with a layer (e.g., a structure, an interface, etc.) 175 in the geologic environment 171 such that a portion of the energy is reflected, which may then be sensed by one or more of the sensors 174. Such energy may be reflected as an upgoing primary wave (e.g., or "primary"). As an example, a portion of emitted energy may be reflected by more than one structure in the geologic environment and referred to as a multiple reflected wave (e.g., or "multiple"). For example, the geologic environment 171 is shown as including a layer 177 that resides below a surface layer 179. Given such an environment and arrangement of the source 172 and the one or more sensors 174, energy may be sensed as being associated with particular types of waves.

As shown in FIG. 1, acquired data 180 can include data associated with downgoing direct arrival waves, reflected upgoing primary waves, downgoing multiple reflected waves and reflected upgoing multiple reflected waves. The acquired data 180 is also shown along a time axis and a depth axis. As indicated, in a manner dependent at least in part on characteristics of media in the geologic environment 171, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy), consider the Thomsen parameters $\varepsilon$, $\delta$ and $\gamma$. The Thomsen parameter $\delta$ can describe offset effects (e.g., short offset). As to the Thomsen parameter $\varepsilon$, it can describe offset effects (e.g., a long offset) and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave.

As an example, seismic data may be acquired for a region in the form of traces. In the example of FIG. 1, the technique 170 may include the source 172 for emitting energy where portions of such energy (e.g., directly and/or reflected) may be received via the one or more sensors 174. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second). As an example, a seismic trace can be a vector with amplitude values where each entry in the vector represents a sample, for example, as sampled according to a sampling rate of a receiver. Such a vector can be amplitude with respect to time for a particular receiver, for a particular "shot" of a seismic source, etc.

Figure 2:
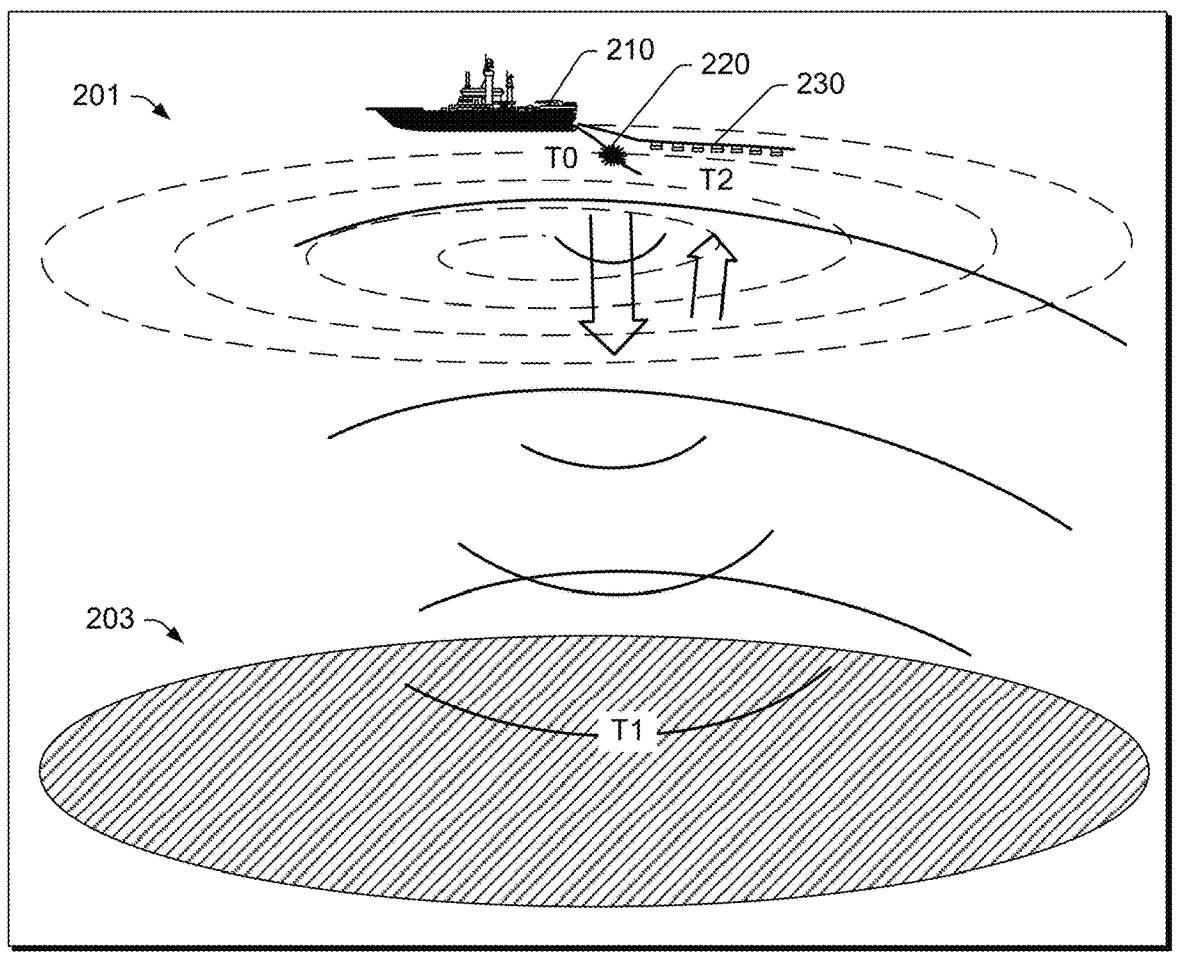
FIG. 2 illustrates an example of a geologic environment and examples of equipment.
Figure 2:
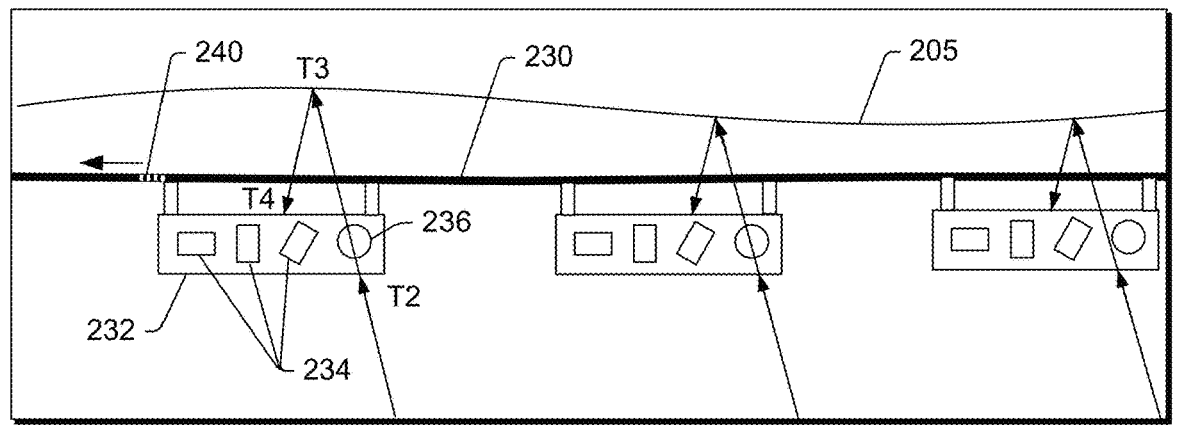
Figure 2:
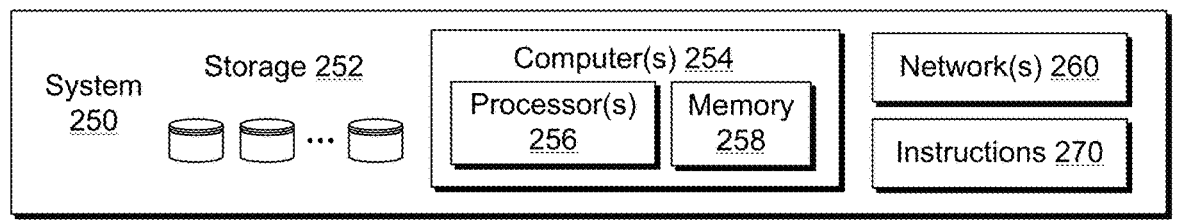

FIG. 2 shows an example of a geologic environment 201 that includes a seabed 203 and a sea surface 205. As shown, equipment 210 such as a ship may tow an energy source 220 and a string of sensors 230 at a depth below the sea surface 205 (e.g., one or more streamers, etc.). In such an example, the energy source 220 may emit energy at a time T0, a portion of that energy may be reflected from the seabed 203 at a time T1 and a portion of that reflected energy may be received at the string of sensors 230 at a time T2.

As mentioned with respect to the technique 170 of FIG. 1, a wave may be a primary or a multiple. As shown in an enlarged view of the geologic environment 201, the sea surface 205 may act to reflect waves such that sensors 232 of the string of sensors 230 may sense multiples as well as primaries. In particular, the sensors 232 may sense so-called sea surface multiples, which may be multiples from primaries or multiples of multiples (e.g., due to sub-seabed reflections, etc.).

As an example, each of the sensors 232 may sense energy of an upgoing wave at a time T2 where the upgoing wave reflects off the sea surface 205 at a time T3 and where the sensors may sense energy of a downgoing multiple reflected wave at a time T4 (see also the data 180 of FIG. 1 and data 240 of FIG. 2). In such an example, sensing of the downgoing multiple reflected wave may be considered noise that interferes with sensing of one or more upgoing waves. As an example, an approach that includes summing data acquired by a geophone and data acquired by a hydrophone may help to diminish noise associated with downgoing multiple reflected waves. Such an approach may be employed, for example, where sensors may be located proximate to a surface such as the sea surface 205 (e.g., arrival times T2 and T4 may be relatively close). As an example, the sea surface 205 or a water surface may be an interface between two media. For example, consider an air and water interface. As an example, due to differing media properties, sound waves may travel at about 1,500 m/s in water and at about 340 m/s in air. As an example, at an air and water interface, energy may be transmitted and reflected.

As an example, each of the sensors 232 may include at least one geophone 234 and a hydrophone 236. As an example, a geophone may be a sensor configured for seismic acquisition, whether onshore and/or offshore, that can detect velocity produced by seismic waves and that can, for example, transform motion into electrical impulses. As an example, a geophone may be configured to detect motion in a single direction. As an example, a geophone may be configured to detect motion in a vertical direction. As an example, three mutually orthogonal geophones may be used in combination to collect so-called 3C seismic data. As an example, a hydrophone may be a sensor configured for use in detecting seismic energy in the form of pressure changes under water during marine seismic acquisition. As an example, hydrophones may be positioned along a string or strings to form a streamer or streamers that may be towed by a seismic vessel (e.g., or deployed in a bore). Thus, in the example of FIG. 2, the at least one geophone 234 can provide for motion detection and the hydrophone 236 can provide for pressure detection. As an example, the data 240 (e.g., analog and/or digital) may be transmitted via equipment, for example, for processing, etc.

As an example, a method may include analysis of hydrophone response and vertical geophone response, which may help to improve a PZ summation, for example, by reducing receiver ghost and/or free surface-multiple noise contamination. As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

As an example, a surface marine cable may be or include a buoyant assembly of electrical wires that connect sensors and that can relay seismic data to the recording seismic vessel. As an example, a multi-streamer vessel may tow more than one streamer cable to increase the amount of data acquired in one pass. As an example, a marine seismic vessel may be about 75 m long and travel about 5 knots, for example, while towing arrays of air guns and streamers containing sensors, which may be located, for example, about a few meters below the surface of the water. A so-called tail buoy may assist crew in location an end of a streamer. As an example, an air gun may be activated periodically, such as about intervals of 25 m (e.g., about intervals of 10 seconds) where the resulting sound wave travels into the Earth, which may be reflected back by one or more rock layers to sensors on a streamer, which may then be relayed as signals (e.g., data, information, etc.) to equipment on the tow vessel.

In the example of FIG. 2, the equipment 210 may include a system such as the system 250. As shown in FIG. 2, the system 250 includes one or more information storage devices 252, one or more computers 254, one or more network interfaces 260 and one or more sets of instructions 270. As to the one or more computers 254, each computer may include one or more processors (e.g., or processing cores) 256 and memory 258 for storing instructions (e.g., consider one or more of the one or more sets of instructions 270), for example, executable by at least one of the one or more processors. As an example, a computer may include one or more network interfaces (e.g., wired or wireless), one or more graphics cards, a display interface (e.g., wired or wireless), etc.

As an example, pressure data may be represented as "P" and velocity data may be represented as "Z". As an example, a hydrophone may sense pressure information and a geophone may sense velocity information. As an example, hydrophone may output signals, optionally as digital data, for example, for receipt by a system. As an example, a geophone may output signals, optionally as digital data, for example, for receipt by a system. As an example, the system 250 may receive P and Z data via one or more of the one or more network interfaces 260 and process such data, for example, via execution of instructions stored in the memory 258 by the processor 256. As an example, the system 250 may store raw and/or processed data in one or more of the one or more information storage devices 252.

Figure 3:
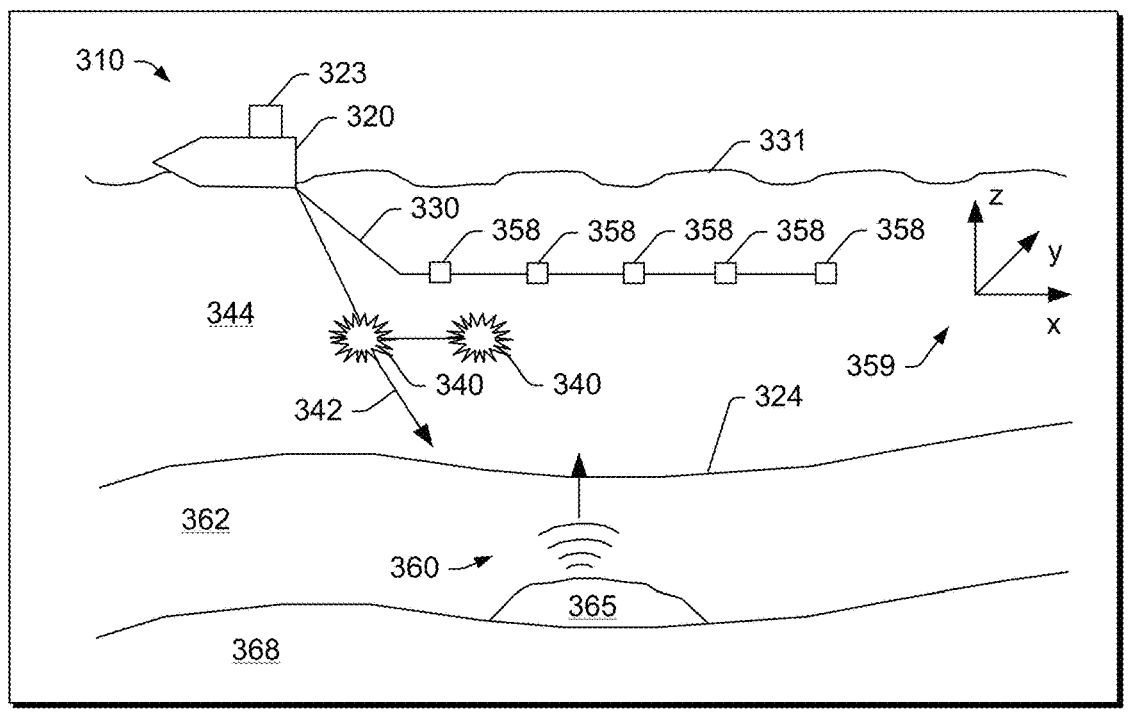
FIG. 3 illustrates an example of a geologic environment, examples of equipment and an example of a method.
Figure 3:
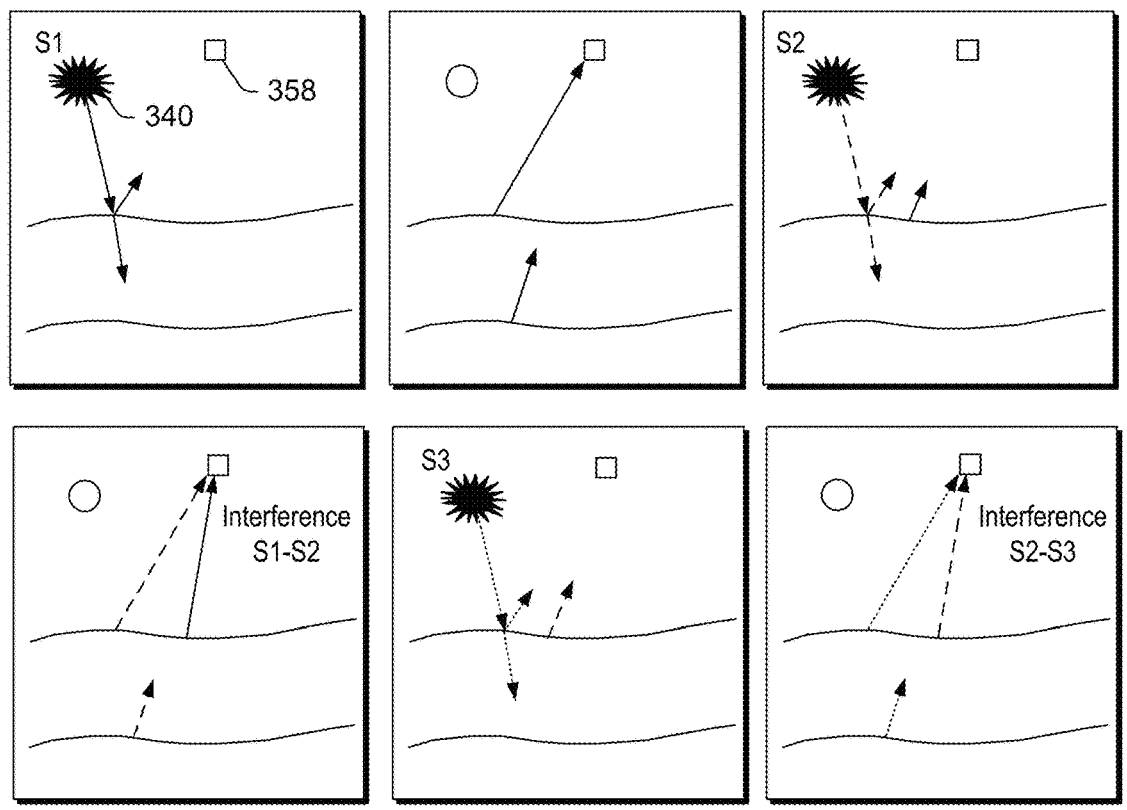

FIG. 3 illustrates a schematic diagram of an example of a marine-based seismic acquisition system 310 and an example of a method 390. In the system 310, a survey vessel 320 may tow one or more seismic streamers 330 behind the vessel 320. As an example, streamers 330 may be arranged in a spread in which multiple streamers 330 are towed in approximately a plane at a depth. As an example, streamers may be towed at multiple depths (e.g., consider an over/under configuration).

As an example, the seismic streamers 330 may be several thousand meters long and may include various support cables, as well as wiring and/or circuitry that may be used to facilitate communication along the streamers 330. As an example, an individual streamer 330 may include a primary cable where the seismic sensors 358 that can record seismic signals may be mounted. As an example, the seismic sensors 358 may include hydrophones that acquire pressure data. As another example, the seismic sensors 358 may include one or more multi-component sensors, for example, consider a sensor capable of detecting a pressure wavefield and at least one component of a particle motion that is associated with acoustic signals that are proximate to the sensor. Examples of particle motions include one or more components of a particle displacement, one or more components (e.g., inline (x), crossline (y) and vertical (z) components (see, e.g., coordinate axes 359) of a particle velocity and one or more components of a particle acceleration.

As an example, the marine-based seismic data acquisition system 310 may include one or more seismic sources 340 (e.g., air guns, etc.). As shown in the example of FIG. 3, the seismic sources 340 may be coupled to, or towed by, the survey vessel 320. As another example, the seismic sources 340 may operate independently of the survey vessel 320 in that the sources 340 may be coupled to another vessel or vessels, to a buoy or buoys, etc.

As an example, the seismic streamers 330 can be towed behind the survey vessel 320 where acoustic signals 342 (e.g., "shots") may be produced by the seismic sources 340. The acoustic signals 342 may be directed down through a water column 344 into strata 362 and 368 beneath a water bottom surface 324. As an example, at least a portion of the acoustic signals 342 may be reflected from subterranean geological formation(s), for example, consider a formation 365 as depicted in FIG. 3.

As an example, incident acoustic signals 342 generated by the sources 340 can produce corresponding reflected acoustic signals, or pressure waves 360, which may be sensed by one or more of the seismic sensors 358. As an example, pressure waves received and sensed by one or more of the seismic sensors 358 may include "up going" pressure waves that propagate to the one or more sensors 358 without reflection and, for example, "down going" pressure waves that are produced in part by reflections of the pressure waves 360 from an air-water boundary 331.

As an example, the seismic sensors 358 may generate signals, which may be traces or structured as traces (e.g., amplitude with respect to time, etc.). For example, consider traces that include information as to measurements of pressure wavefield and particle motion. As an example, signals may be recorded and may be processed by a signal processing unit 323, which may optionally be deployed on the survey vessel 320.

As an example, a method can include performing a seismic survey that acquires seismic data (e.g., traces, etc.) where such data can build an "image" of a survey area, for example, for purposes of identifying one or more subterranean geological formations (see, e.g., the formation 365). As an example, subsequent analysis of seismic data (e.g., interpretation, etc.) may reveal one or more possible locations of hydrocarbon deposits in one or more subterranean geological formations. As an example, an analysis can include determining one or more characteristics of one or more types of hydrocarbons. As an example, an analysis can include one or more of image generation and attribute generation (e.g., seismic attribute generation, etc.).

As an example, a particular one of the one or more seismic sources 340 may be part of an array of seismic source elements (e.g., air guns, etc.) that may be arranged in strings (e.g., gun strings, etc.) of the array. As an example, one or more sources may be fired (e.g., actuated to emit energy) according to a time schedule (e.g., a timing sequence) during a survey. As an example, a land-based seismic acquisition system may acquire data that may be processed, for example, via one or more of the methods described herein.

As mentioned, sources may be fired (e.g., actuated) according to a time schedule, a timing sequence, etc. As an example, consider a sequential source firing method that includes firing sources at intervals combined with continuous vessel travel. As another example, consider a simultaneous source firing method that include firing more than one shot at a given point in time (e.g., within a small duration of time such that analysis may consider the shots to be simultaneous). In such an example, sensors may sense information from multiple simultaneous shots and, for example, processing of the sensed information may separate the sensed information into individual source components. As an example, where simultaneous source firing is implemented, "boat time" (e.g., turnaround time, etc.) may be approximately the same or less than a sequential technique (e.g., depending on survey parameters, goals, etc.).

In FIG. 3, the method 390 includes firing a source 340 at a source firing time S1, firing the source 340 at a source firing time S2 and firing the source 340 at a source firing time S3. The method 390 also includes receiving signals at the seismic sensor 358. Such a method may result in strong deep interference. For example, where after one shot is fired from a source, a subsequent shot is fired from the source and energy associated with the subsequent shot is received at a seismic sensor over a period of time during which energy from the prior shot is also received. In such an example, a portion of energy of the prior shot interferes with acquisition of energy from the latter shot. The portion of energy from the prior shot may be referred to as late arriving energy (e.g., late data). As an example, interference may also occur in a survey where sources are fired in a relatively simultaneous manner. In such an example, some amount of interference may be expected and, for example, a purposeful part of a survey.

As to the energy associated with the source 340 at the source firing time S1, it can be partially reflected at an interface to generate a reflected upgoing portion while another portion penetrate deeper toward another interface. Thus, in the simplified illustration, two portions exist, an upgoing portion and a downgoing portion. As illustrated, at approximately a source firing time S2, an upgoing portion from the source firing time S1 and an upgoing portion from the source firing time S2 can exist. As these portions travel upwards, they can arrive at the seismic sensor 358 over a common span of time to result in S1-S2 interference. As illustrated, for the source firing time S3, there may be S2-S3 interference. Accordingly, interference can exist in data for a plurality of shots of a survey.

As an example, interference can exist in one or more types of surveys such as, for example, a land-based survey or a sea-based survey. As mentioned, interference can be more pronounced where a survey aims to acquire data for deep structures in a geologic environment.

As an example, interference may be a type of noise that can be amenable to handling via a computing system that includes one or more GANs. As an example, a vessel may include a computing system that includes one or more GANs (e.g., one or more trained GANs) that can include an interface that receives data from one or more streamers (e.g., sensors thereof). Such a computing system may operate in real-time to process data as it is acquired. In such an example, processed data may be generated that has lesser noise (e.g., attenuated noise) and/or processed data may be generated that identifies one or more types of noise, which may be utilized to control, adjust, repair, etc., one or more components of a seismic survey system.

Figure 4:
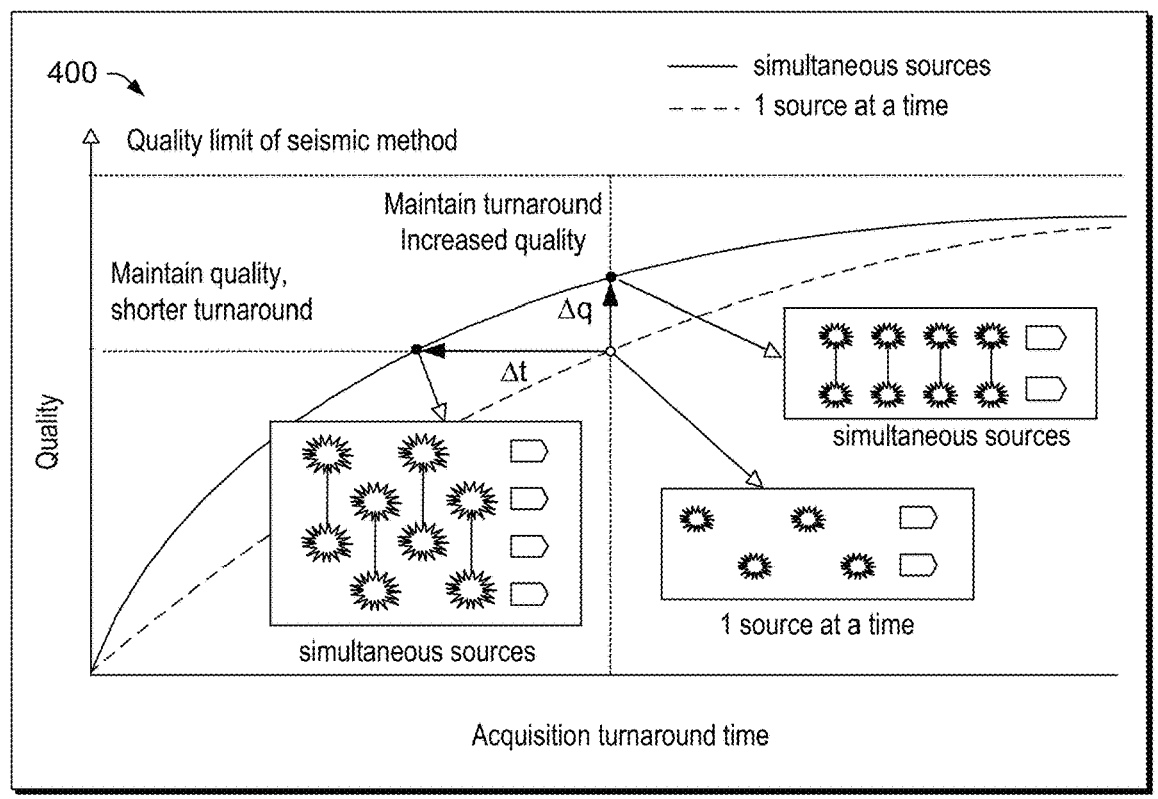
FIG. 4 illustrates an example of a geologic environment and examples of equipment.
Figure 4:
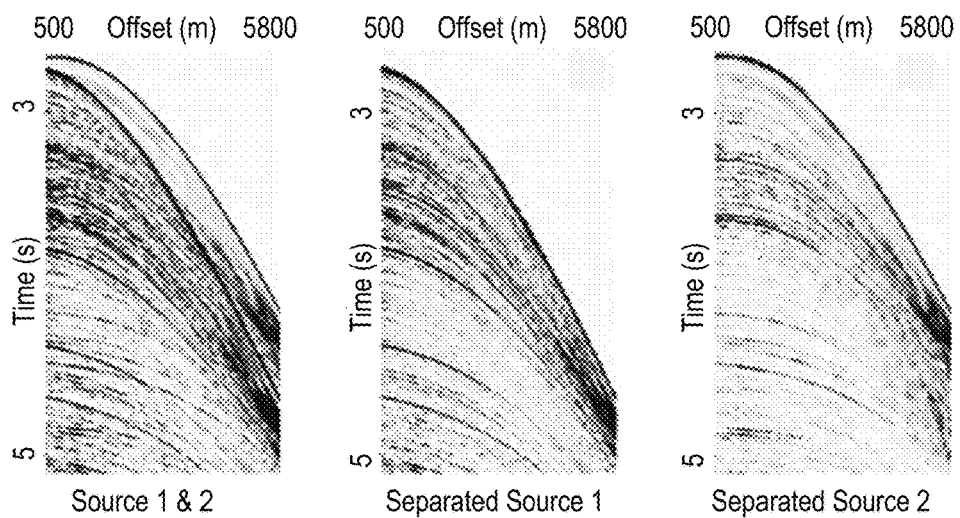

FIG. 4 shows an example plot 400 of quality versus acquisition turnaround time. For example, consider a simultaneous seismic source acquisition and processing technique that may allow for an improvement in quality for a standard turnaround time or a reduced turnaround time that may aim to achieve a quality level of a sequential technique (e.g., which would take a longer time). In FIG. 4, a dashed curve corresponds to a single source firing at a time approach while a solid curve corresponds to a simultaneous source firing at a time approach. As illustrated, time may be shortened (see, e.g., $\Delta t$) and/or quality may be improved (see, e.g., $\Delta q$). As mentioned, interference may occur in one or more types of surveys.

FIG. 4 also shows a series of images 410 for shots where a shot is an emission from a source. In the example, a pair of guns in a four-boat configuration fired sources (shots or emissions) in an acquisition time window. The left image demonstrates the presence of two water-bottom reflections where an upper reflection is associated with source 2. The center and right images show the shot record on the left after source separation where the center image corresponds to source 1 and the right image corresponds to source 2. Such a process is referred to as "source separation".

A method for source separation can include acquiring seismic data of a survey that utilizes multiple sources where the seismic data include blended seismic data for a number of emissions from a corresponding number of the multiple sources and associating at least two portions of the blended seismic data correspondingly with at least two of the multiple sources. For example, in FIG. 4, the blended seismic data are the data shown in the left image for sources 1 and 2, while the portions shown in the center and right are associated with source 1 and source 2, correspondingly. In such a process (e.g., source separation), noise can present some issues that may confound associating portions of blended seismic data correspondingly with sources.

Figure 5:
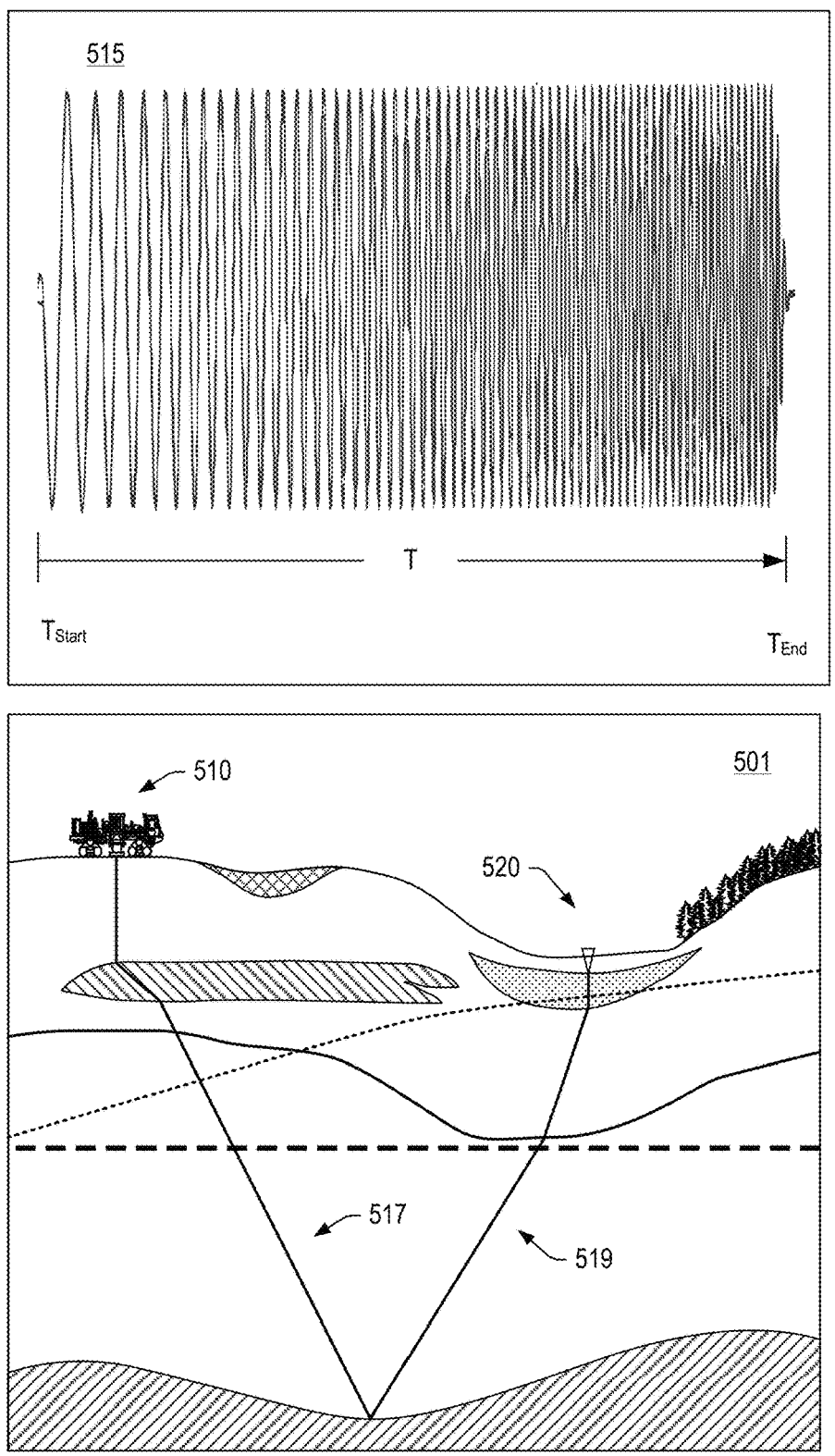
FIG. 5 illustrates an example of a geologic environment, an example of a method, examples of equipment and examples of data.

FIG. 5 shows a geologic environment 501 (lower left), equipment 510, a plot 515 of a frequency sweep as generated by the equipment 510 (e.g., with start and end times), downgoing energy 517 of the frequency sweep, upgoing energy 519 of the frequency sweep, and a sensor 520 (a node as in an array or grid). While FIG. 5 is shown as a land-based survey, various features, actions, etc., may be applied in a marine survey where seabed sensors are employed (see the marine-based survey 380 of FIG. 3).

As an example, data can be data of a simultaneous vibroseis survey that includes seismic energy emissions S1, S2 and S3. Such data may be plotted as a correlated record from a simultaneous vibroseis acquisition where artifacts of an air blast from S1 (cross airwave), chimney noise from S3 and harmonic from S3 (cross harmonic) may be labeled along with a slip time and a record length for S2 (about 5 seconds). In a vibroseis survey, various types of noise may be present such as chimney noise, which may be seen when data are correlated with a survey sweep and visualized (as a column). As to other types of noise, these may include ground-roll and/or air-blast types of noise. In a slip-sweep operations data can be recorded as a mother record where the interval between two consecutive sweeps is referred to as the slip time (see S1 and S2 and slip time).

As mentioned, a computing system can include one or more GANs that can process seismic data. For example, such seismic data may be from one or more types of surveys, some of which have been explained with respect to FIGS. 1, 2, 3, 4 and 5.

Figure 6:
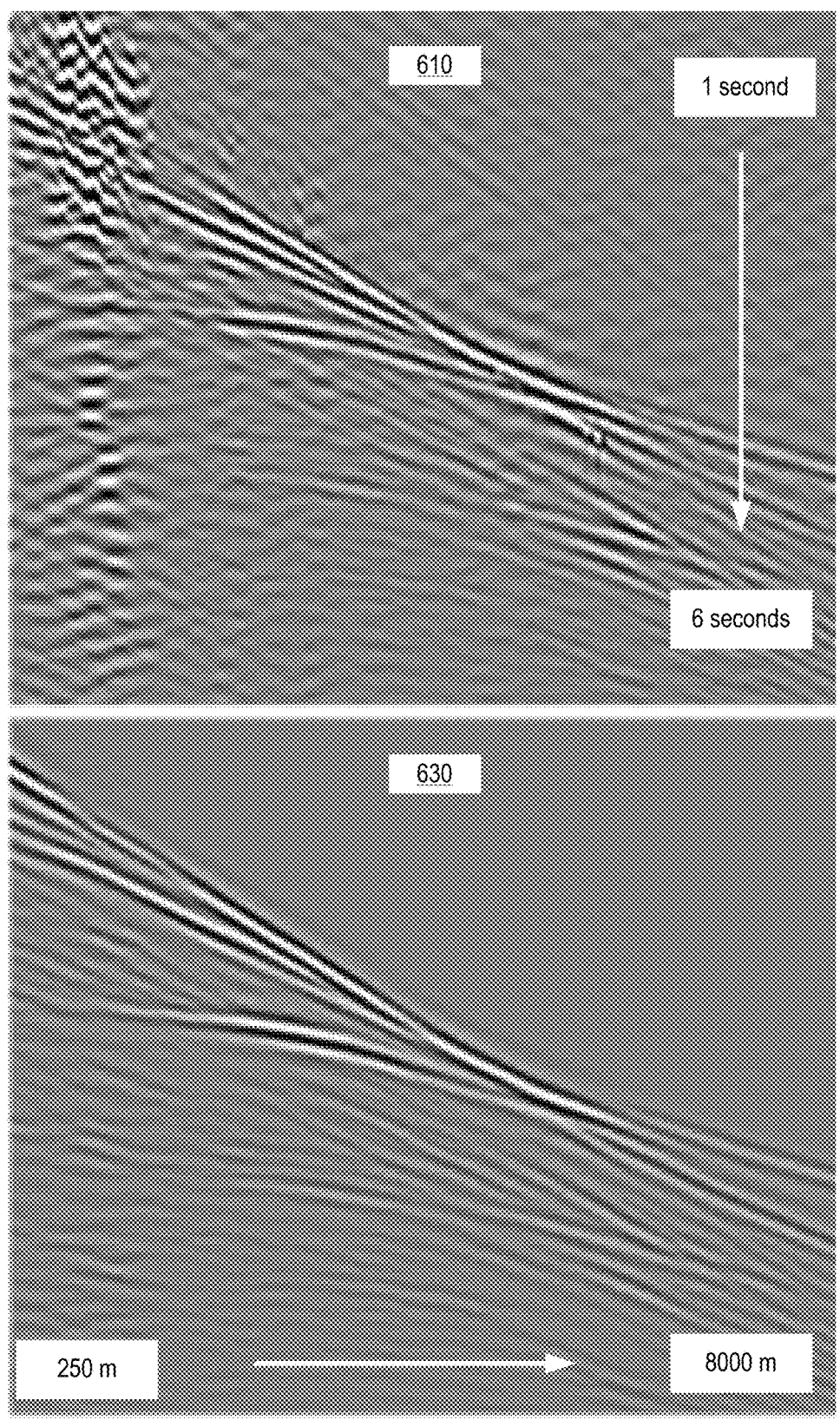
FIG. 6 illustrates examples of plots.

FIG. 6 shows example plots 610 and 630 that are results output by a computing system that implements one or more Generative Adversarial Noise Attenuation Networks (GAN-ANs) for noise attenuation. In the plots of FIG. 6, the plot 610 is an input shot that is received as seismic data that are passed through a trained network of the computing system to generate the processed seismic data of the plot 630. As shown in the examples of FIG. 6, kinematics of the input shot are maintained, but the swell noise in the near channels is attenuated, along with artifacts at farther offsets. In this example, the GANAN works as a strong dip filter, operating with some knowledge of the kinematics of a seismic shot record.

At one level, a GAN can involve two networks competing in an adversarial manner to generate data that fits a given distribution. A computing system may implement more than two GANs where, for example, competition may be for common and/or different features. As an example, in a GAN, a generator G (e.g., a generator network) can take an input and generates data, while a discriminator D (e.g., a discriminator network) tries to determine if the output from G is a real example or generated. At the start of training, G tends to generate random noise, and D tends to be able to readily determine that the outputs of G are not real (e.g., fake or otherwise inadequate representations of real features). After training, however, G will tend to recover a data distribution, and D will tend to be less able and possibly unable to distinguish between real samples and generated ones.

As an example, a computing system can utilize one or more deep convolutional neural networks (CNNs). For example, the aforementioned generator G and discriminator D may each be a CNN (e.g., or CNNs). In such an example, a GAN can be a Deep Convolutional GAN (DCGAN).

As an example, a CNN can be built around a series of convolutional filters that learn to identify particular features of input data. For example, consider identification tasks where a CNN can learn filters for edge detection, color blurring, and other useful features for distinguishing a class of images. By learning various filters and passing them through a network with several layers, a CNN learns to "see" an image in desired manner. As an example, a DCGAN may be utilized to see a subsurface region based at least in part on seismic data. In such an example, the output may be akin to that of a seismic interpretation framework, which may utilized seismic attributes, models, etc. to generate data and, for example, to render such data to a display for human viewing.

As mentioned, a computing system can include one or more GANs for seismic noise attenuation. Random noise in seismic data can, at times, be relatively easy for a human to identify by eye (e.g., upon viewing seismic data rendered to a display). However, a computing system may be less sensitive to features and/or patterns that are due to noise and, for example, may prove inadequate in attenuating noise in a manner that does not impact signal (e.g., useful signal).

As an example, a computing system can, in an effort to handle noise, convert seismic data of one or more of different domains, such as, for example, the FK or Radon domains. Such domain transformations demand computing resources (e.g., processor time and memory space), which can add runtime to a noise attenuation workflow as well as involve analysis from a human expert. As CNNs can be modeled after the ways humans interpret information, a CNN-based approach can allow for identifying and attenuating noise in a seismic shot record, optionally without performing one or more domain transforms. As an example, a computing system can include circuitry that can implement a DCGAN approach that aims to replicate one or more results as may be achieved via a human and/or a more arduous computational path that involves experts and domain transforms.

As an example, a method can include building a Generative Adversarial Noise Attenuation Network (GANAN) in a manner of conditioned style transfer type networks. Such a class of GAN can utilize data in two forms and can attempt to generate one form from the other form. Such a GANAN can be utilized to process seismic data, for example, by changing a noisy image to a clean one (e.g., noisy seismic data to noise attenuated seismic data). As an example, a method can include training a network to perform such a task through use of a noise-free shot to pair with each input shot. Seismic noise attenuation workflows tend to leave some noise in the data, for example, to reduce undesirable signal attenuation. As an example, a GAN-based approach on shots with noise can be utilized to attempt to recreate that noise.

As an example, a method can include generating a noise-free shot. For example, a computing system can be utilized to generate synthetic shots with a real data geometry using, for example, a finite difference modeling (FDM) engine (e.g., or other numerical technique). As an example, by using a velocity model that has been updated through Full Waveform Inversion (FWI) and Reflection Tomography (RT), a computing system can help to ensure that a set of synthetic shots possess the underlying kinematics of real data, for example, without random noise associated with real-world acquisition (e.g., equipment and/or processes). As an example, coherent and/or physically explainable noise, such as multiples, can be modeled, leaving random noise different between two datasets.

A discriminator model can be built according to a DCGAN framework. For example, it can take an image, either real or generated, as input, and pass it through a series of convolutional filters, or layers. In such an example, each layer of the network can downsample the image until a final layer is a single value representing the probability of the image being real (e.g., or fake).

Figure 7:
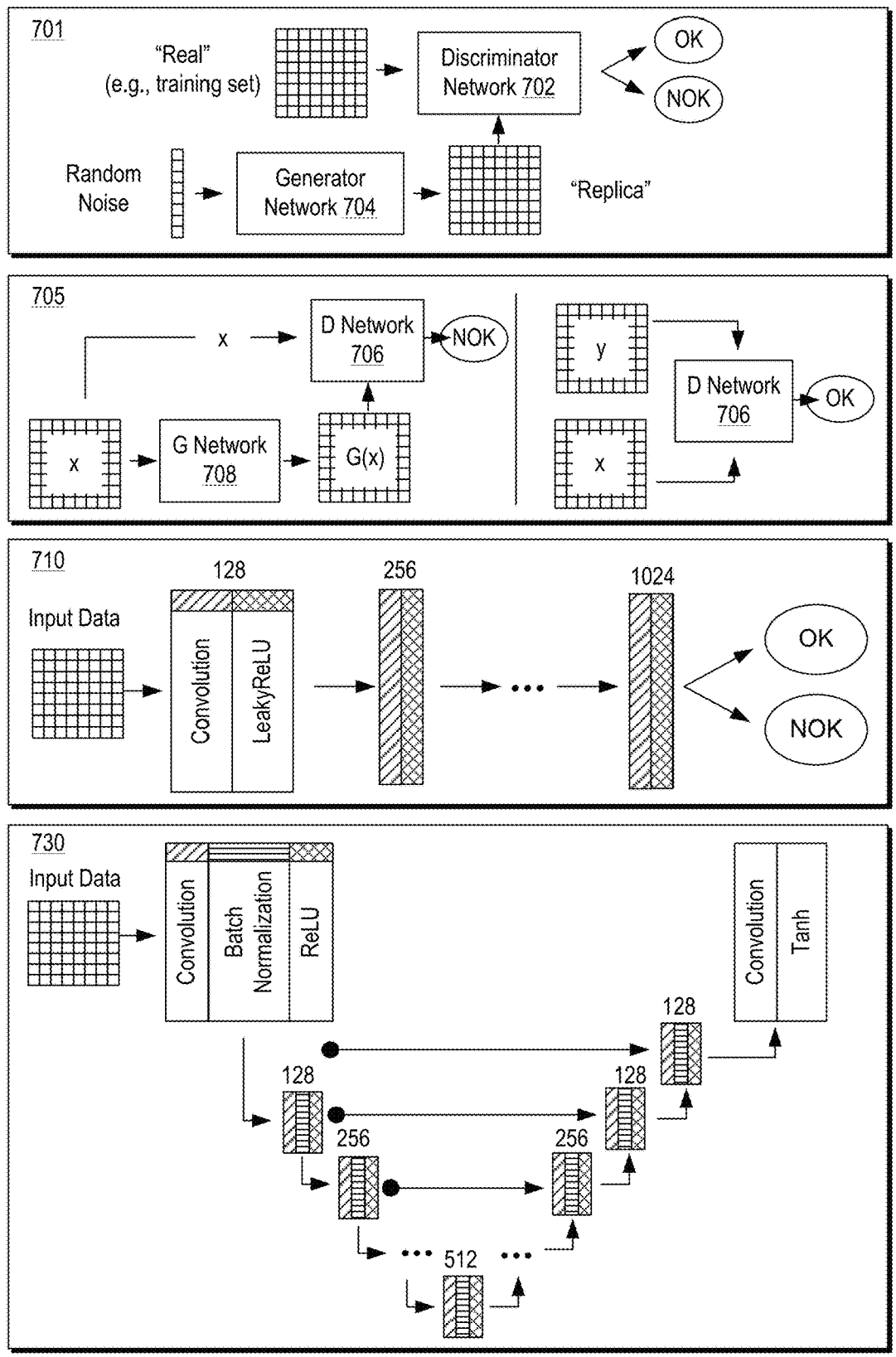
FIG. 7 illustrates examples of network architectures and processes.

FIG. 7 shows example graphics 701, 705, 710 and 730 of an architecture of a computational framework that can be utilized for processing seismic data. The graphic 701 shows a discriminator network 702 and a generator network 704, which can be neural networks. The discriminator network 702 can operate using a training set and the generator network 704 can operate using random noise where a distribution may be chosen from random noise. For example, the generator network 704 can take a vector as input and return an image. The generator network 704 may be represented by a function "G". The discriminator network 702, which may be represented by a function "D" can take an image as input and returns a probability that the image was sampled from an (unknown) probability distribution of data. As shown, the discriminator network 702 can output a label or classification (e.g., "real", "fake", OK, NOK, etc.).

As an example, a generator network can take in random numbers and return an image. The generated image can be fed into a discriminator network alongside one or more images taken from a "ground-truth" dataset. As shown in the example of FIG. 7, the discriminator network 702 takes in different types of images such as "real" (e.g., ground-truth) and "fake" (e.g., generated or replica) and returns a probability such as a number between 0 and 1, with 1 representing a prediction of authenticity and 0 representing fake. Such an approach can include a double feedback loop: the discriminator network 702 is in a feedback loop with the ground truth of the images (known); and the generator network 704 is in a feedback loop with the discriminator network 702.

While images are mentioned, in various examples, seismic data (e.g., actual and/or synthetic) are utilized as the "ground-truth" for a discriminator network and seismic data are generated by the generator network (e.g., generative network) for feeding to the discriminator network such that the discriminator network can make determinations (e.g., outputs) that facilitate training of the generator network. As an example, noise in seismic data may be identified as being "fake" and signal in seismic data may be identified as being "real". As an example, a method can include identifying signal and/or noise and processing seismic data based thereon to, for example, enhance seismic data as to signal. As an example, where an analysis of noise is desired, a method can include identifying noise in seismic data and analyzing the noise (e.g., to improve further processing, to understand source thereof, to improve acquisition, etc.). As an example, an adversarial network may be utilized to identify signal and/or noise in seismic data where such seismic data includes signal and one or more types of noise. Such an approach can, for example, aim to enhance signal (e.g., by extracting signal, attenuating noise, etc.).

As an example, a discriminator network can be a convolutional network that can categorize data fed to it such as by binomial classifier labeling input as real or fake (e.g., or signal or noise). As an example, a generator network can be an inverse convolutional network, in a sense. For example, while a convolutional classifier can take an image and downsample it to produce a probability, a generator network can take a vector of random noise and upsample it to become an image. In such a characterization, the first throws away data through downsampling techniques like maxpooling, and the second generates "new" data.

In an adversarial approach, two networks can try to optimize a different and opposing objective function, or loss function, in a zero-sum game (e.g., an actor-critic model). In such an example, as the discriminator changes its behavior, so does the generator, and vice versa, such that their losses push against each other.

As explained, a GAN can be implemented to make generated seismic data that are indistinguishable from actual seismic data or synthetic seismic data. As explained, a GAN can learn a loss that tries to classify an output as being "real" or "fake", while training a generative model to minimize the loss. As a GAN can learn a loss that that adapts to data, a GAN can be applied, for example, to a task such as changing noisy seismic data to clean seismic data (e.g., attenuating noise in noisy seismic data). For example, consider a GAN in a conditional setting, which may be referred to as a "cGAN". A cGAN can be suitable for image-to-image types of tasks, as explained with respect to a GANAN. Such an approach can condition on an input and generate a corresponding output. An article by Isola et al., "Image-to-Image Translation with Conditional Adversarial Networks," arXiv: 1611.07004 (2017) is incorporated by reference herein.

Another image-to-image type of approach is described in an article by Gatys et al., "A Neural Algorithm of Artistic Style," arXiv:1508.06576 (2015), which is incorporated by reference herein. The article by Gatys et al. describes representations of content and style using a convolutional neural network (CNN) approach where content and style can be separable and where a trained network can handle both representations independently to produce new, perceptually meaningful images. Gatys et al. generate images that mix the content and style representation from two different source images, specifically, matching the content representation of a photograph depicting the "Neckarfront" in Tuebingen, Germany and style representations of several well-known artworks taken from different periods of art. Images were synthesized by finding an image that simultaneously matches the content representation of the photograph and the style representation of the respective piece of art. Such an approach can render a photograph in the style of the artwork, such that the appearance of a synthesized image resembles the work of art, even though it shows the same content as the photograph. The approach can handle content and style with a loss function that is minimized during image synthesis that includes two terms for content and style, respectively, which are separable such that it is possible to smoothly regulate the emphasis on either reconstructing content or style. A CNN approach provides for a separation of image content from style, thus allowing recasting of the content of one image in the style of another image. For example, to generate images that mix the content of a photograph with the style of a painting, a CNN approach can jointly minimize the distance of a white noise image from the content representation of the photograph in one layer of the network and the style representation of the painting in a number of layers of the CNN.

As an example, a method can implement one or more types of image-to-image approaches, which, in terms of seismic data can be seismic data-to-seismic data approaches, which can include actual seismic data, in raw and/or processed forms, and/or synthetic seismic data (e.g., without and/or without noise). In seismic data, unlike a photographic image, a domain may be a mixed domain (e.g., heterogeneous domain) with respect to time and space. As an example, time can be a proxy for depth and, for example, seismic data may be in a spatial domain (e.g., inline and depth, crossline and depth, inline and crossline, etc.). As mentioned, seismic data can be in the form of seismic traces with amplitude values that have corresponding times where each seismic trace can be associated with at least a receiver of seismic survey equipment. As an example, times may be transformed to depths. As mentioned, a seismic data-to-seismic data approach can involve inputting seismic data and outputting seismic data where, for example, the output seismic data are noise attenuated. Such output can be improved output, for example, in terms of signal to noise ratio where the signal represents physical, tangible objects in the Earth.

The graphic 705 shows an example of a cGAN that includes a discriminator network 706 and a generator network 708. In one instance, the discriminator network 706 indicates NOK (e.g., "fake") while in another instance, the discriminator network 706 indicates OK (e.g., "real"). The graphic includes various nomenclature, for example, a "regular" GAN may learn a mapping from a random noise vector z to an output image y, G: z→y; whereas, a conditional GAN can learn a mapping from an observed image x and a random noise vector z, to y, G: {x, z}→y. As noted, the condition GAN (cGAN) involves learning a mapping using an observed image x, and a random noise vector z, to an output image y. In such an approach, the generator G can be trained to produce outputs that are to some degree indistinguishable from "real" inputs via an adversarially trained discriminator D, which is trained to do as well as possible at detecting generator generated "fakes". In the graphic 705, consider training a cGAN to map edges to a photographic image. In such an example, the discriminator D learns to classify between fake (e.g., G(x)) and real {edge, photo} tuples. The generator G learns to "fool" the discriminator D. As illustrated, in the cGAN example of the graphic 705, the generator network 708 and the discriminator network 706 "observe" the input, which in the foregoing example, can be the input edge map.

As an example, a GAN can utilize an approach as described in with respect to the graphic 705 to provide an input grid to output grid mapping where a difference can be, for example, with respect to noise.

As an example, a method can utilize an approach as in the graphic 705 of FIG. 7 where synthetic seismic images (y) and real seismic images (x) are used in training by a discriminator D such that a generator G is trained to output G(x), which can be a noise attenuated seismic image. As explained herein, various approach can be utilized with seismic data that input actual and/or synthetic seismic data and that output generated seismic data (e.g., noise attenuated seismic data, enhanced resolution seismic data, etc.).

As an example, a generator network can be utilized in a conditional GAN (e.g., cGAN) that has a UNet (or "U-Net") architecture, for example, as explained with respect to the graphic 730 of FIG. 7. As an example, a discriminator network can be a PatchGAN that operates to penalize features at a scale of patches (e.g., N×N patches).

The graphic 710 shows details for a discriminator (e.g., discriminator network) and the graphic 730 shows details for a GANAN generator, which can be a type of conditional GAN (e.g., cGAN) (see, e.g., the graphic 705). In the example of FIG. 7, the discriminator can include features of a CNN framework (e.g., image identification tasks where the result is a single value); where, in the example of FIG. 7, representing whether an image is real or generated. In the graphics 710 and 730, the number above each layer corresponds to a number of filters in the layer. The generator can use a similar downsampling but follows the downsampling layers with a corresponding series of connected upsampling ones. As shown, the final layer of the generator can aim to create an image with size and amplitude of the input.

In the graphics 710 and 730, hatching is presented for operations such as convolution, leaky ReLU, and batch normalization (see, e.g., Ronneberger et al., Isola et al., etc.). Such operations can be utilized to define one or more network architectures.

As an example, consider a UNet architecture as described in an article by Ronneberger et al., "U-Net: Convolutional Networks for Biomedical Image Segmentation," arXiv: 1505.04597 (2015), which is incorporated by reference herein. Such an architecture includes a contracting path (see the left side of the graphic 730) and an expansive path (see the right side of the graphic 730). The article by Ronneberger et al. describes a contracting path that follows an architecture of a convolutional network and that includes repeated application of convolutions and use of a rectified linear unit (ReLU) along with a max pooling operation with a specified stride for downsampling where, in an expansive path, upsampling of a feature map can be performed followed by convolution.

In the article by Isola et al., an architecture is described by letting Ck denote a Convolution-BatchNorm-ReLU layer with k filters where CDk denotes a Convolution-BatchNorm-Dropout-ReLU layer with a dropout rate of Y percent. Convolutions may be defined by "spatial" filters (e.g., operating in a domain of seismic data, which can be temporal and spatial) with size and stride. As an example, convolutions in an encoder and in a discriminator can downsample by a specified factor (e.g., 2, etc.); whereas, in a decoder they can upsample by a specified factor (e.g., 2, etc.). As to a generator architecture, an encoder-decoder architecture, can be specified using notation such as "C128", "C256", "C512", etc.; and "CD512", "CD256", "CD128", etc. As an example, after a last layer in decoder, a convolution can be applied to map to a number of output channels, followed by a Tanh function. As an exception to the above notation, batch normalization (e.g., Batch-Norm) may not be applied to a first layer in an encoder. As an example, ReLUs in an encoder may be specified to be leaky with a slope or not leaky and ReLUs in a decoder may be specified to be leaky with a slope or not leaky. As an example, a U-Net architecture can include such features, for example, with skip connections. Such skip connections can concatenate activations (e.g., from layer i to layer n), which may alter the number of channels in a decoder. As to a discriminator architecture, after a last layer, a convolution may be applied to map to a 1-dimensional output, followed by a Sigmoid function (e.g., or other suitable function). As an example, batch normalization may or may not be applied to a layer. As an example, ReLU can be leaky with a slope or not leaky.

As explained with respect to the graphic 701 and the graphic 705, a GAN-based approach can involve two networks competing in an adversarial game to generate data that fits a given distribution. In such an approach, a generator G can, for example, take an input and generate data while a discriminator D tries to determine if the output from G is "real" or "fake" (e.g., OK or NOK), where "real" can be a camera light photography image and where a "fake" can be a generated image (e.g., aimed to be a replica of a camera light photography image). At the start of training, G can generate random noise, and D will be able to readily determine that output images are "fake". After training, however, G can recover a data distribution, and D will be less and less able to distinguish between "real" images and generated "fake" images.

As explained, a method can utilize a generator network (e.g., a G network) and a discriminator network (e.g., a D network) that can process signal data such as seismic signal data. As explained with respect to the graphic 705, a method can include an image-to-image translation or a seismic data-to-seismic data translation where, for example, input seismic data include signal and noise and where output seismic data are noise attenuated.

Seismic signal data differ from camera light photography in various ways. A digital camera can include a CCD image sensor array that can output pixel values response to an image being focused upon the CCD image sensor array by an optical lens where the image corresponds to a real world object that can be seen by the human eye. Specifically, visible light can shine upon the real world object to illuminate it where such illumination can travel to the lens and hence be focused upon the digital camera's CCD image sensor array, which can generate a pixel image of the real world object that, to the human eye, looks identical to the real world object. As may be appreciated, a CCD image sensor array can be an integrator that sums exposure (e.g., consider accumulation of electrons that proceeds until image integration is over and charge begins to be transferred, or thermal equilibrium is reached). As such, a time varying signal is not acquired or represented in digital camera still image data.

In contrast, seismic imaging aims to understand physical, real world structures that exist within the Earth. Seismic imaging is a dynamic process that acquires time varying signals (e.g., amplitudes with respect to time). Seismology can be utilized to "image" subsurface structures through use of one or more sources and receivers. Seismic imaging can involve processing to place reflections in their appropriate locations with appropriate amplitudes. As explained, interpretation can be performed through analysis of amplitude data, which may be contaminated by one or more types of noise. An increase in signal to noise (e.g., SNR) can improve interpretation. Such an increase can be via one or more processes, which may aim to separate signal and/or noise, to attenuate noise, to boost signal, etc. In seismic data, amplitudes can be indicative of relative changes in impedance of structures in the Earth and volumetric seismic data may be processed to yield impedances between the reflecting boundaries.

When acquiring seismic data, noise that is unrelated to the subsurface can be introduced by mechanics of acquisition equipment and/or an acquisition process. For example, with marine data, strong currents can introduce a high amplitude noise signature that can be much stronger than the seismic signal that is desired. Techniques to attenuating such noise (e.g., noise patterns) tend to rely on careful sorting of the data, or transforming the time/space data to a different domain such as Radon domain or FK domain (Frequency/wavenumber). Such schemes demand expert knowledge to remove noise effectively, and tend to be very sensitive to small mis-parameterizations. As an example, a GAN-based technique can allow for building a noise attenuation tool using examples of clean and noisy data, which can be performed optionally without human intervention to achieve results.

Intuitively, a GAN can learn an underlying distribution of data (e.g., via a generator and a discriminator). As an example, when a GAN-based approach is applied to seismic data, a method can include learning what components of seismic data (e.g., a seismic shot record, etc.) are "real" (e.g., desired signal) and what parts are noise. Once a network is trained to have such an ability or abilities, it is able to use its learned distribution(s) to reconstruct one or more "real" parts of seismic data (e.g., a real part of a seismic shot, etc.) and to discard information that it identifies as noise.

As an example, a generator network can be based around a UNet architecture. The UNet is a CNN that includes progressive downsampling as in the discriminator network and follows these layers with a corresponding series of upsampling layers to recover the resolution of the input. As an example, upsampling layers can utilize what are termed "skip connections," which link them to the corresponding downsampling layers. Such an approach allows higher level features to track directly across the network. In seismic data processing, network-based computing system can aim to keep high-level details from the input shot at least in part via one or more skip connections particularly useful.

Referring again to FIG. 6, the plot 630 shows the results of GANAN on a seismic shot record. The plot of 610 corresponds to a shot that had already been through a transform-based noise attenuation workflow, however it was unable to attenuate the strong swell noise at the water bottom. As the GANAN approach is attempting to make the shot indistinguishable from a synthetic modeled shot, the output does not possess swell energy that is on the input. The success of the network on the deeper section is less clear, as it is hard to see reflectivity on the near traces of the input. As an example, the GANAN approach can be directed to various aspects, features, etc., of a shot (e.g., a type of seismic data). As an example, consider a focus on recovering such signal, for example, via forward modeling with a Born modeling engine that is designed to capture deeper reflectivity.

As mentioned, a GAN-based approach may be utilized for trace interpolation. As an example, consider applying one or more image "super-resolution" approach to trace interpolation.

As to trace interpolation, as an example, a discriminator network may be of a same or similar form as to a noise attenuation network while a generator may differ in form. As an example, a network architecture may include features of a scheme such as, for example, that of Ledig et al. (2017) ("Photo-Realistic Single Image Super-Resolution Using a Generative Adversarial Network," arXiv:1609.04802), which is incorporated by reference herein and includes some aspects of a UNet used in a GANAN.

As to noise attenuation, in an interpolation, it can be desirable to maintain high-level features from the input data as it flows through the network. For example, consider utilization of "Residual Blocks" (see, e.g., He et al. (2015), "Deep Residual Learning for Image Recognition," arXiv: 1512.03385, which is incorporated by reference herein).

Figure 8:
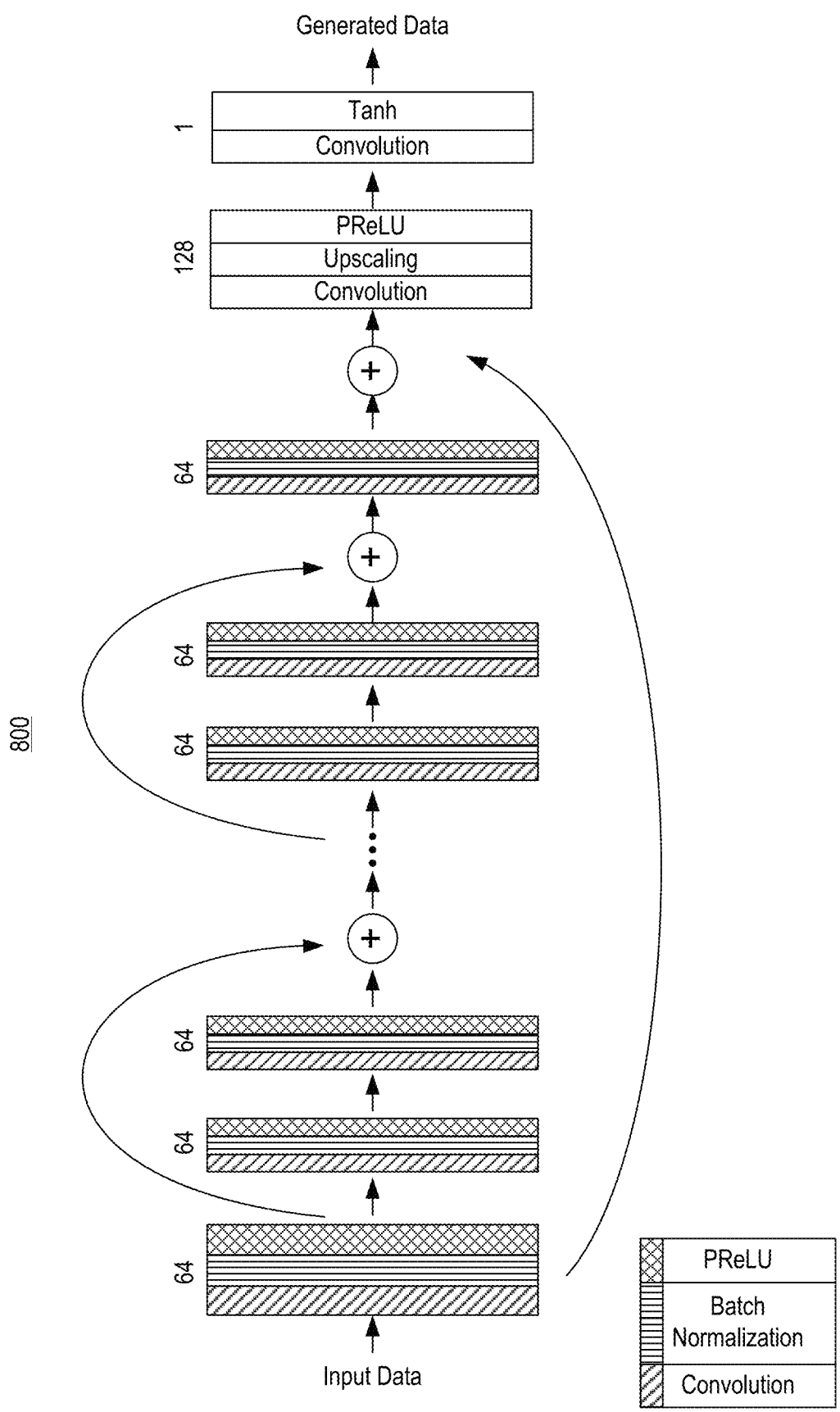
FIG. 8 illustrates examples of network architectures and processes.

FIG. 8 shows an example of an architecture 800 of a network that includes skip connections within each block of layers to pass features down the network. As an example, a network may include one or more skip connections.

In the example of FIG. 8, various details of the network architecture 800 for a GATIN generator are illustrated. As shown, the GATIN generator can include convolutional filters, normalization, and an activation function. In the example of FIG. 8, after the first layer, the network proceeds to residual layers, where the output of two convolutional layers is added to the input to the residual layer. In the example of FIG. 8, after the residual blocks, there is another convolutional layer before the first layer is added again. As in GANAN, these connections can help to ensure that high-level features follow through the network before the upsampling is performed.

In the example of FIG. 8, after the residual layers, the next task for the network is to perform the upsampling. Such a task may be performed through use of a layer of the network that is able learn upsampling filters, for example, for each feature map. Such a layer may be akin to a sub-pixel convolutional layer as may be utilized efficiently for super-resolution tasks. As an example, through combining residual blocks with a final sub-pixel convolutional layer, a generator takes on an architecture of a Generative Adversarial Trace Interpolation Network, or GATIN.

As mentioned, a ReLU can be "leaky", which can allow a small, non-zero gradient when the unit is not active. As another example, a ReLU can be parameter (e.g., a "PReLU"), which can include a coefficient of leakage as a parameter that is learned along with the other neural network parameters. In the example architecture 800, ReLUs can include one or more non-leaky ReLUs, one or more leaky ReLUs and/or one or more PReLUs.

Figure 9:
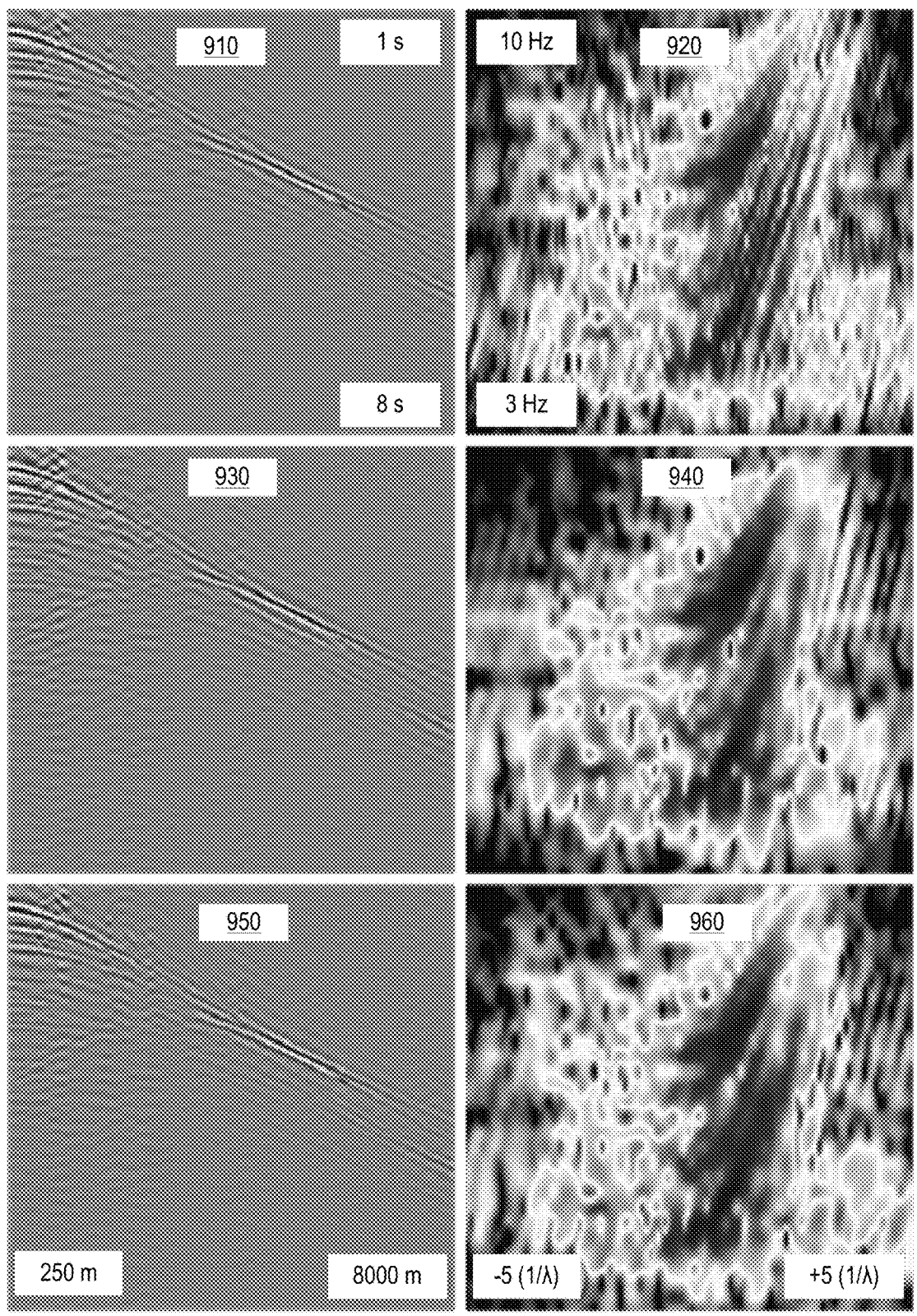
FIG. 9 illustrates examples of plots.

FIG. 9 shows a series of plots 910, 920, 930, 940, 950 and 960. In FIG. 9, GATIN results, from top to bottom, include a decimated shot, interpolated with GATIN, and the original undecimated shot. The perceptual quality of the interpolation is quite high, including desired effects such as the complex diffraction and undesired effects such as interpolation of noise in the input data. By taking the data to FK space, it is possible to demonstrate that the interpolation is able to recover spatial wavelengths that are lost in the original downsampling. As mentioned, a workflow may optionally include one or more transforms as to one or more domains. In such an example, a network or networks may be utilized (e.g., GAN, GANAN, GATIN, etc.).

The GATIN results of FIG. 9 demonstrate improvements when comparing original data to the decimated and interpolated output. Visually the images appear substantially indistinguishable, which can be a success criterion in image upsampling tasks. As an example, an interpolation can recover the visual qualities of the input data and accurately recover the energy in the shot record. To demonstrate success at that level, the data can be transformed into the FK domain and a comparison can be made of the input shot record to the decimated and re-interpolated result. In such an approach, a workflow can operate with an aim to recover the original trace spacing after decimation. The results illustrated in FIG. 9 demonstrate how interpolating beyond the acquisition receiver spacing may be achieved utilizing one or more network-based approaches.

As an example, a GANAN and/or a GATIN can be built to consume a multidimensional shot record such as, in various examples, a 2D shot record (e.g., one source firing into one cable). As an example, one or more GANANs and/or GATINs may be built to handle one or more spatial dimensions and/or one or more temporal dimensions. As an example, consider 3D spatial seismic data and/or 4D seismic data with a temporal dimension (e.g., time as a dimension). Where time is a dimension, one or more networks may be utilized to identify one or more time-related phenomena. For example, consider signal and/or noise where at least a portion of the signal and/or at least a portion of the noise can change with respect to time (e.g., weather, equipment, changes in a subsurface environment due to injection, production, fracturing, etc.).

As an example, a series of seismic data may be received as input where the series may be with respect to time or with respect to space. For example, consider a seismic cube (e.g., a 3D array of seismic data that corresponds to a subterranean volume). In such an example, planes may be analyzed as a series of seismic data. As to time, consider a series of slices that can be of a common area of a subterranean environment where each of the slices in the series corresponds to a different time. As an example, such an approach may aim to handle noise that can differ with respect to time where, for example, signal and/or noise may be processed. In such an example, processing of noise may provide one or more indications as to one or more phenomena (e.g., causes) of the noise and may help to determine whether noise may be changing, in a favorable manner or an unfavorable manner. Such an approach may be utilized for one or more additional surveys (e.g., setting one or more parameters to account for a trend in noise).

As an example, a computing system may receive input from multiple cables into networks. For example, consider a computing system that can receive data from a plurality of streamers and that can process the data in real-time where processed data can be attenuated with respect to noise. As an example, noise attenuated data may be more amenable to compression and decompression, which may be lossy or lossless. For example, where signal to noise ratio can be increased, compression may be applied in a lossy manner with reduced impact on signal compared to a lossy manner being applied to data with a lesser signal to noise ratio. In such an example, computational and/or transmission efficiencies may be improved such that computation in real-time and/or transmission in real-time may be performed. As an example, real-time computation and/or transmission can provide for one or more decisions such as control decisions to be made (e.g., communication, transmitted, etc.) in lesser time, which can make surveying and/or interpretation more efficient.

As an example, a method can include processing seismic data in 2D and/or 3D (e.g., or higher dimensionality). As an example, an architecture can include 3D convolutions as may be supported by one or more deep learning frameworks.

As an example, the TENSORFLOW framework (Google LLC, Mountain View, Calif.) may be implemented, which is an open source software library for dataflow programming that includes a symbolic math library, which can be implemented for machine learning applications that can include neural networks. As an example, the CAFFE framework may be implemented, which is a deep learning framework developed by Berkeley AI Research (BAIR) (University of California, Berkeley, Calif.).

The TENSORFLOW framework can run on multiple CPUs and GPUs (with optional CUDA (NVIDIA Corp., Santa Clara, Calif.) and SYCL (The Khronos Group Inc., Beaverton, Oreg.) extensions for general-purpose computing on graphics processing units (GPUs)). TENSORFLOW is available on 64-bit LINUX, MACOS (Apple Inc., Cupertino, Calif.), WINDOWS (Microsoft Corp., Redmond, Wash.), and mobile computing platforms including ANDROID (Google LLC, Mountain View, Calif.) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

Figure 10:
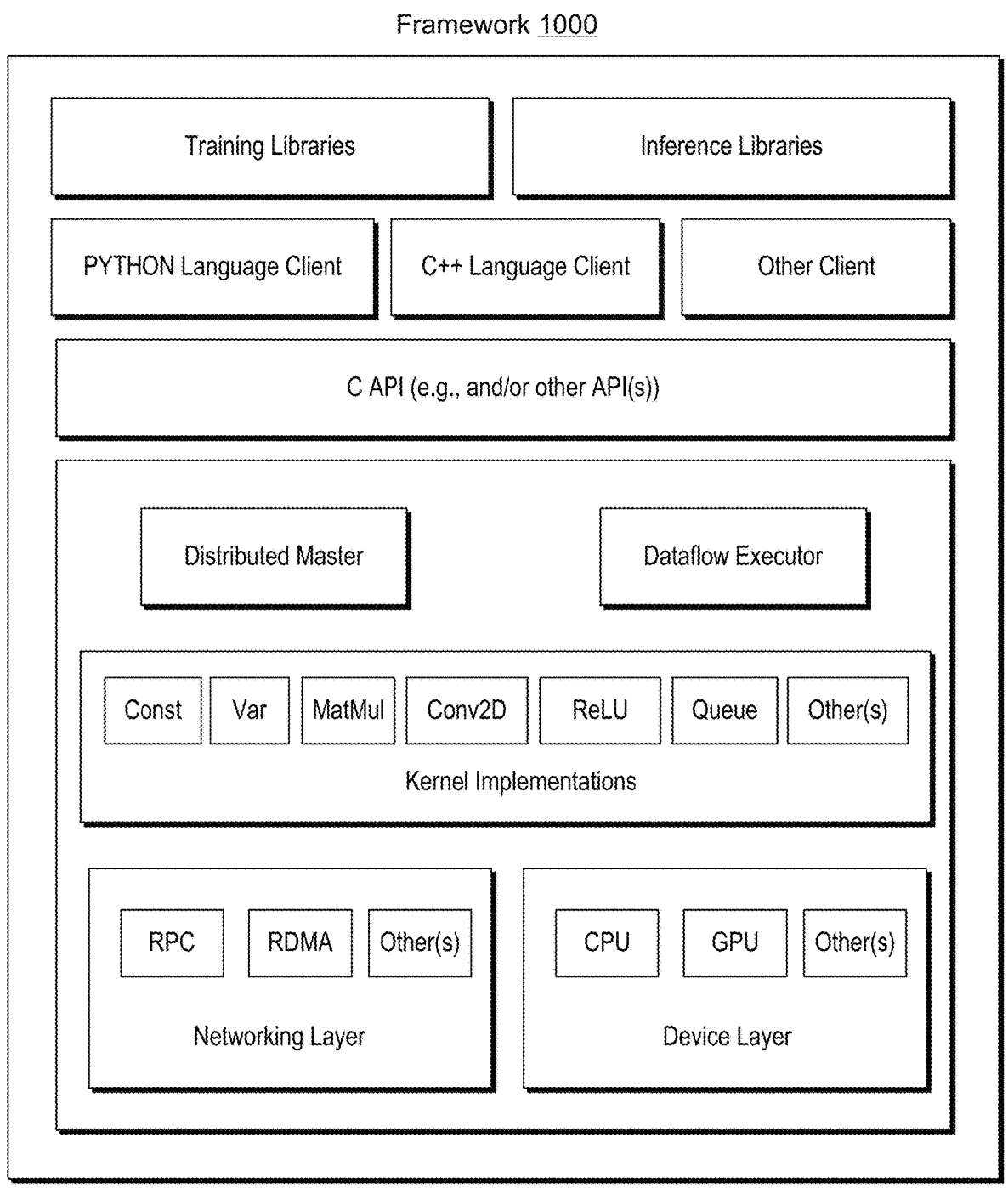
FIG. 10 illustrates an example of an architecture of a framework.

FIG. 10 shows an architecture 1000 of a framework such as the TENSORFLOW framework. As shown, the architecture 1000 includes various features. As an example, in the terminology of the architecture 1000, a client can define a computation as a dataflow graph and, for example, can initiate graph execution using a session. As an example, a distributed master can prune a specific subgraph from the graph, as defined by the arguments to "Session.run( )";

partition the subgraph into multiple pieces that run in different processes and devices; distributes the graph pieces to worker services; and initiate graph piece execution by worker services. As to worker services (e.g., one per task), as an example, they may schedule the execution of graph operations using kernel implementations appropriate to hardware available (CPUs, GPUs, etc.) and, for example, send and receive operation results to and from other worker services. As to kernel implementations, these may, for example, perform computations for individual graph operations.

Figure 11:
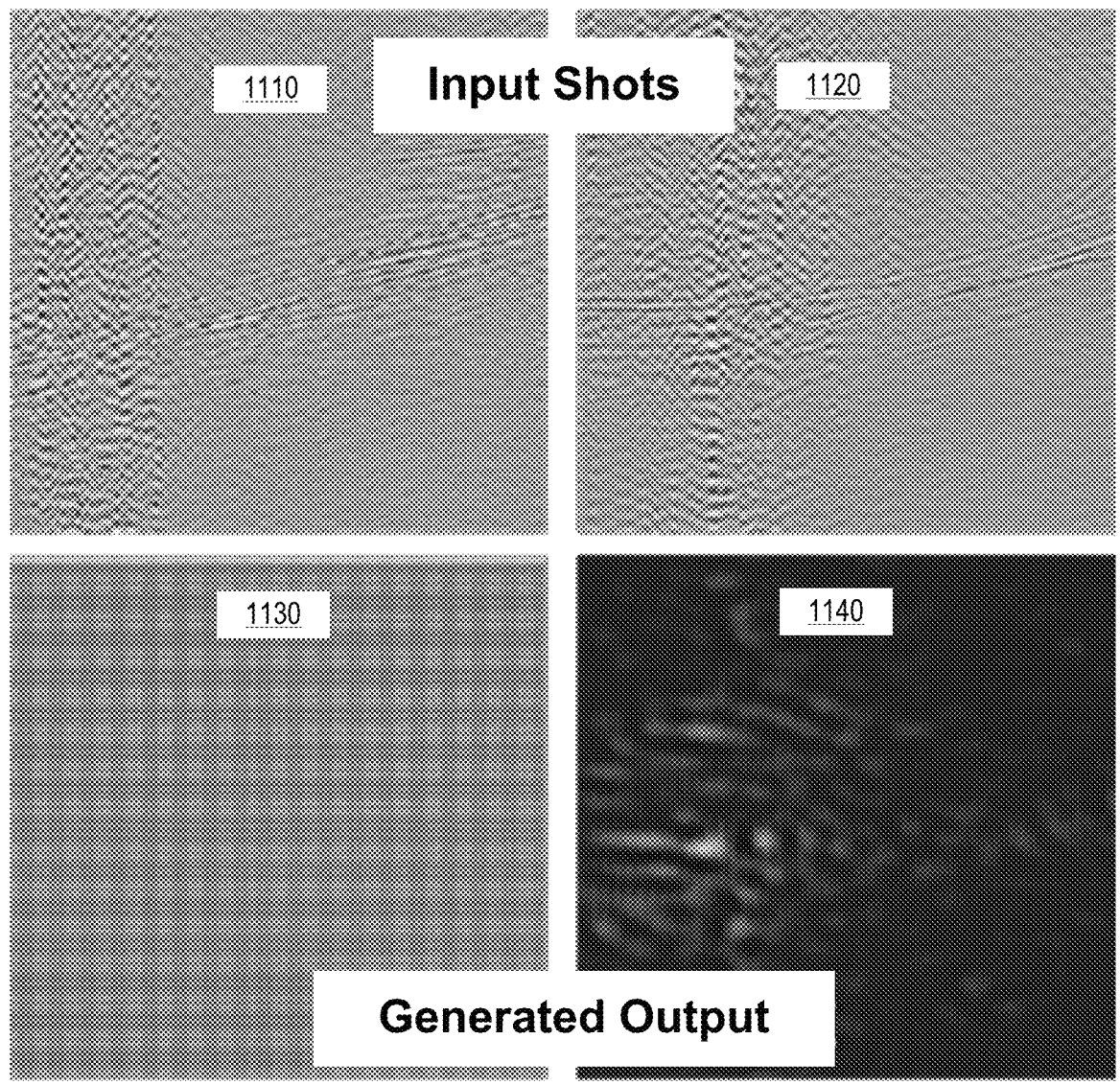
FIG. 11 illustrates examples of plots.

FIG. 11 shows example plots 1110, 1120, 1130 and 1140. As an example, forms of mode collapse may occur building GANAN. In FIG. 11, the plots 1110 and 1120 show input shots while the plots 1130 and 1140 show GANAN output. In the plots 1110 and 1130, a generator is unable to come up with useful filters and outputs random noise for input; whereas, in the plots 1120 and 1140, the generator is able to find filters that capture some high-level information that can "fool" a discriminator; however, the resultant data can be rendered to a display, for example, for human review where it can be seen as noise. As an example, a method can include using a Wasserstein loss function in one or more of a discriminator network and a generator network. Such an approach can help to overcome mode collapse for these networks.

As an example, a computing system can include features to implement a Wasserstein loss function. As an example, such a function may help to address divergences that GANs tend to minimize, which are potentially not continuous with respect to a generator's parameters and, therefore, can lead to training difficulty. For example, consider a using an Earth-Mover (also called Wasserstein-1) distance W (q, p), which is informally defined as the minimum cost of transporting mass in order to transform the distribution q into the distribution p (where the cost is mass times transport distance). Under mild assumptions, W (q, p) is continuous everywhere and differentiable almost everywhere.

Various examples of equations appear below as Equations (1), (2) and (3). As to Equation (1), it pertains to a formal definition of a "game" between a generator G and a discriminator D as being a minimax objective for a GAN.

$$\min_G \max_D \mathbb{E}_{x \sim \mathbb{P}_r}[\log(D(x))] + \mathbb{E}_{\tilde{x} \sim \mathbb{P}_g}[\log(1 - D(\tilde{x}))] \quad (1)$$

where $\mathbb{P}_r$ is the data distribution and $\mathbb{P}_g$ is the model distribution implicitly defined by $\tilde{x}=G(z)$, $z \sim p(z)$ where the input z to the generator is sampled from some simple noise distribution p, such as the uniform distribution or a spherical Gaussian distribution.

$$\min_G \max_{D \in \mathcal{D}} \mathbb{E}_{x \sim \mathbb{P}_r}[D(x)] - \mathbb{E}_{\tilde{x} \sim \mathbb{P}_g}[D(\tilde{x})] \quad (2)$$

where $\mathcal{D}$ is the set of 1-Lipschitz functions and $\mathbb{P}_g$ is once again the model distribution implicitly defined by $\tilde{x}=G(z)$, $z \sim p(z)$. In that case, under an optimal discriminator (called a critic, as it is not trained to classify), minimizing the value function with respect to the generator parameters minimizes $W(\mathbb{P}_r, \mathbb{P}_g)$.

$$L = \mathbb{E}_{\tilde{x} \sim \mathbb{P}_g}[D(\tilde{x})] - \mathbb{E}_{x \sim \mathbb{P}_r}[D(x)] + \lambda \mathbb{E}_{\hat{x} \sim \mathbb{P}_{\hat{x}}}[(\|\nabla_{\hat{x}} D(\hat{x})\|_2 - 1)^2] \quad (3)$$

where the first two terms represent the critic loss and the last term represents the gradient penalty.

Above, Equation (2) is for a WGAN value function constructed using the Kantorovich-Rubinstein duality. The WGAN value function results in a critic function whose gradient with respect to its input is better behaved than its GAN counterpart, making optimization of the generator easier. As an example, the WGAN value function may correlate with sample quality. As an example, to enforce the Lipschitz constraint on the critic, a method may clip the weights of the critic to lie within a compact space [−c, c]. In such an example, the set of functions satisfying this constraint is a subset of the k-Lipschitz functions for some k which depends on c and the critic architecture.

Above, Equation (3) includes a gradient penalty. Equation (3) can be an alternative to clipping weights that can be achieved via penalizing the norm of gradient of the critic with respect to its input. Such an approach can, in various circumstances, perform better than standard WGAN and enable stable training of various of GAN-based architectures.

As to a Wasserstein loss function, in mathematics, the Wasserstein or Kantorovich-Rubinstein metric or distance is a distance function defined between probability distributions on a given metric space M. Such an approach can be referred to as an "Earth Mover's distance" approach. For example, if each distribution is viewed as a unit amount of "dirt" piled on M, the metric is the minimum "cost" of turning one pile into the other, which is assumed to be the amount of dirt that is to be moved times the distance it has to be moved. As an example, a loss function may be utilized that can be matched to one or more types of mode collapse, for example, to reduce risk of a type or types of mode collapse.

As mentioned, a GAN can be a cGAN. For example, consider an objective function of a cGAN according to Equation (4):

$$\mathcal{L}_{cGAN}(G, D) = \mathbb{E}_{x,y}[\log(D(x, y))] + \mathbb{E}_{x,z}[\log(1 - D(x, G(x, z)))] \quad (4)$$

where G tries to minimize the objective against an adversarial D that tries to maximize it (see, e.g., Isola et al.).

As an example, where a "content and style" type of approach is implemented, a loss function may be written in a form akin to Equation (5):

$$\mathcal{L}_{total}(\vec{p}, \vec{a}, \vec{x}) = \alpha \mathcal{L}_{total}(\vec{p}, \vec{x}) + \beta \mathcal{L}_{total}(\vec{a}, \vec{x}) \quad (5)$$

where $\vec{p}$, $\vec{a}$, and $\vec{x}$ are the photograph (e.g., content), the artwork (e.g., style) and the generated artwork (e.g., stylized photograph as generated artwork), respectively, and where α and β are the weighting factors, adjustable for content and style reconstruction, respectively (see, e.g., Gatys et al.).

As mentioned, one or more approaches can be implemented for seismic data. For example, consider "structure" or "content" being represented by synthetic seismic data without noise and "artwork" or "style" being actual seismic data. In such an example, the synthetic seismic data can be output with "style" of noise. As another example, consider "structure" or "content" being actual seismic data with noise and "artwork" or "style" being synthetic seismic data without noise. In such an example, the actual seismic data can be output in a style that is with attenuated noise. As yet another example, consider attenuating noise in actual seismic data to produce a noise attenuated "style" of seismic data. Such attenuating may utilize one or more approaches to generate the noise attenuated seismic data. In such an example, actual seismic data with noise can be input where output is of the actual seismic data in a noise attenuated "style" (e.g., a "style" as achieved using one or more approaches to noise attenuation, etc.). As an example, a Wasserstein loss function approach may be implemented in "content and style" type of approach, for example, in one or more of multiple loss terms.

Training a GAN can demand an amount of computing power, for example, in the initial training of the network. For example, a CNN as described can have tens to hundreds of millions of parameters in the network, leading to a large memory demand for a heavily decimated seismic dataset. GAN performed on images of 32×32 or 64×64 pixels can be, at times, too small to include useful seismic information. As an example, low frequency data with a large spatial sampling rate and decimated trace counts may be utilized (see, e.g., various plots herein). Such an approach allowed networks to be trained on a single GPU. As an example, parallelization can be utilized to train a GANAN and/or GATIN network at a desired seismic resolution (see, e.g., sample rates of seismic data acquisition and sensing).

As explained, ill-posed problems can suffer from a failure case known as mode collapse, examples of which can be seen in the plots 1110, 1120, 1130 and 1140 of FIG. 11. Where such mode collapse occurs, the generator's output collapses to random noise, and the discriminator can choose a probability, such as, for example, 0.5, for inputs. As explained, use of a loss function such as a Wasserstein loss function can help to reduce risk of mode collapse when building GANs for seismic data processing due to the subtle features in a shot record.

As mentioned, the selection of a loss function in the network can have an effect on results of a machine learning process. As an example, for generating realistic seismic data, a method may utilize a loss function other than mean squared error. As mentioned, the Wasserstein loss with a gradient penalty term may be implemented. Such a loss function can be robust and help to reduce risk of obtaining results without suffering from mode collapse. Various examples demonstrate use of GANs for tasks in seismic processing.

As an example, a method can implement a cycle-GAN approach. For example, consider image-to-image translation as a class of vision and graphics problems that aims to learn the mapping between an input image and an output image using a training set of aligned image pairs. However, in some situations, paired training data is not available or not available to an extent that makes training robust. As an example, a cycle-GAN approach can be utilized for learning to translate an image from a source domain X to a target domain Y without using paired examples. As an example, such an approach may be supplemented where one or more paired examples exist.

As an example, consider a problem that aims to learn a mapping G: X→Y such that the distribution of images from G(X) is indistinguishable from the distribution Y using an adversarial loss. As such a mapping can be highly underconstrained, an approach can include coupling it with an inverse mapping F: Y→X and introduce a cycle consistency loss to enforce F (G(X))~X (and vice versa).

Figure 12:
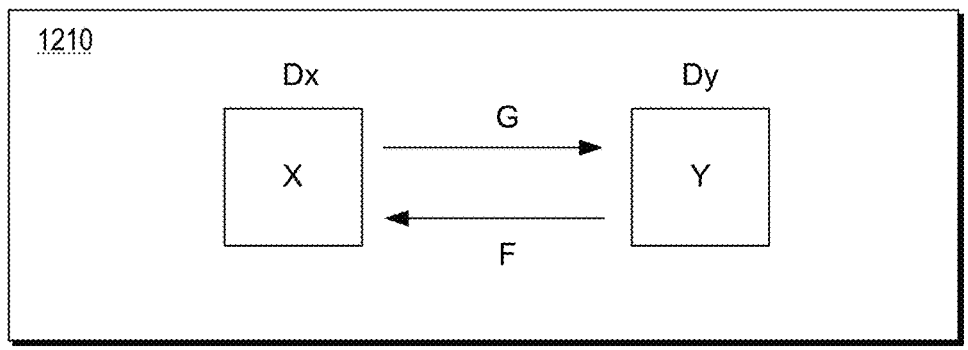
FIG. 12 illustrates examples of graphics of a cycle generative adversarial network (cycle-GAN)
Figure 12:
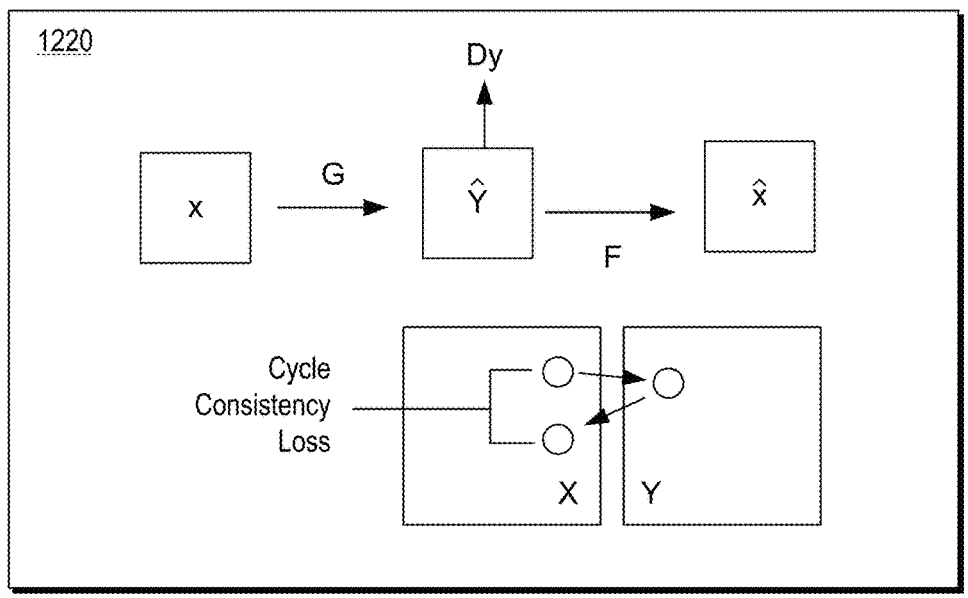
Figure 12:
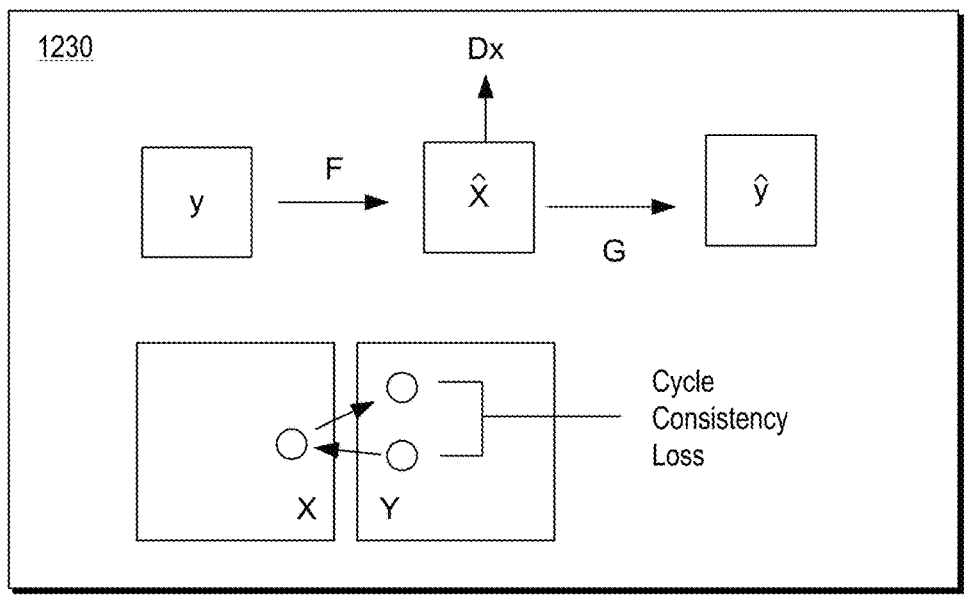

FIG. 12 shows graphical examples of models and associated operations 1210, 1220 and 1230. As shown in the graphic 1210, a model can include two mapping functions G: X→Y and F: Y→X and associated discriminators Dy and Dx where Dy encourages G to translate X into outputs indistinguishable from domain Y, and vice versa for Dx and F. To further regularize the mapping, two cycle consistency losses can be introduced that capture the intuition that for translations from one domain to the other and back again, the translations can be expected to return to the starting point. The graphic 1220 shows a forward cycle-consistency loss (x→G(x)→F(G(x))~x) and the graphic 1230 shows a backward cycle-consistency loss (y→F(y)→G(F(y))~y). An article by Zhu et al., "Unpaired Image-to-Image Translation using Cycle-Consistent Adversarial Networks", arXiv: 1703.10593v6 [cs.CV], https://arxiv.org/abs/1703.10593 (submitted on 30 Mar. 2017 (v1), revised 15 Nov. 2018 (v6)), is incorporated by reference herein.

Figure 13:
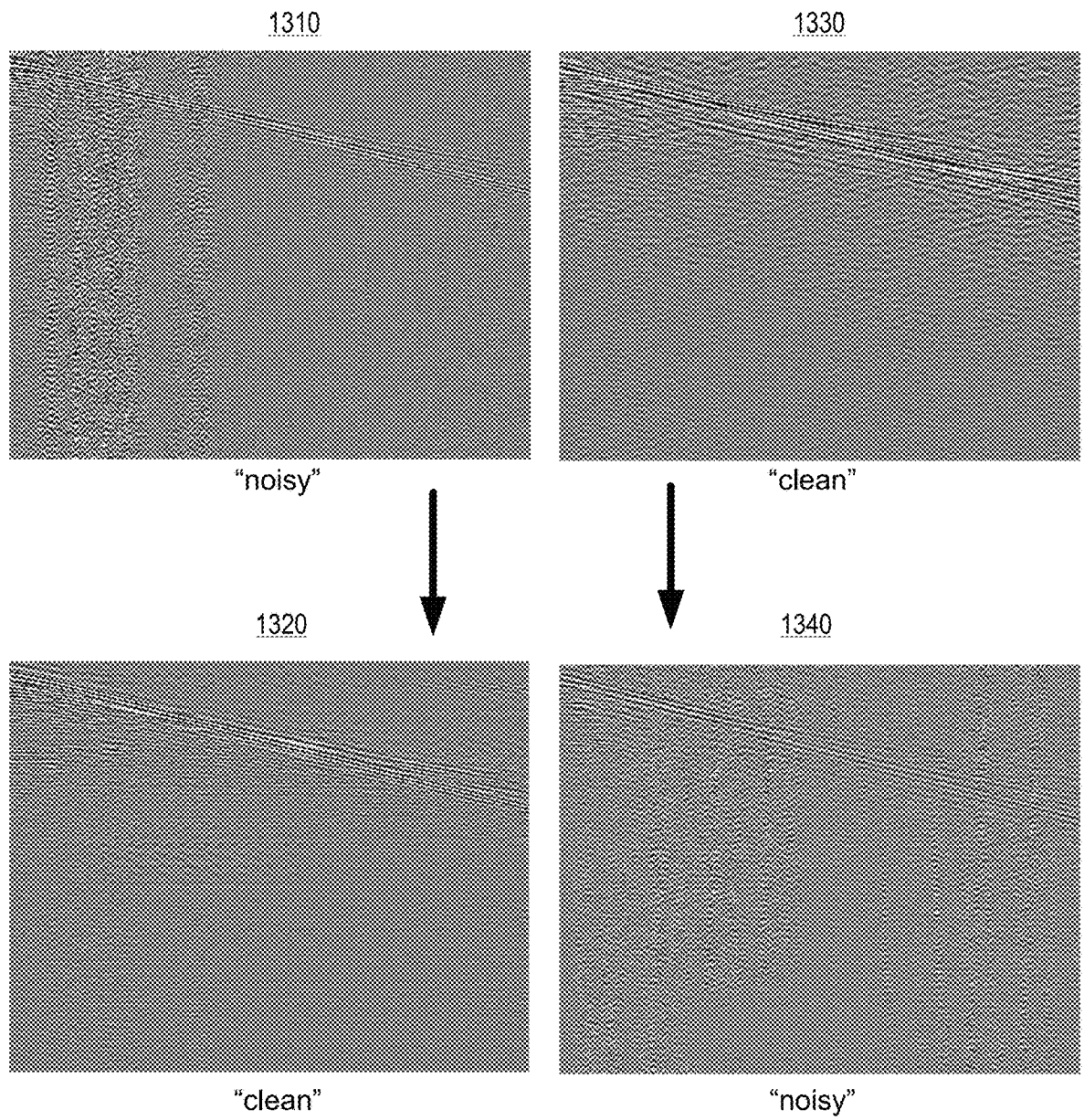
FIG. 13 illustrates examples of plots.

FIG. 13 shows examples of images 1310, 1320, 1330 and 1340 where the images 1310 and 1320 correspond to noisy and clean, respectively, and where the images 1330 and 1340 correspond to clean and noisy, respectively. The images 1310, 1320, 1330 and 1340 demonstrate a use of a GANAN framework in a cycle-GAN approach. Using data that had been identified as clean and noisy, a network was trained to convert one to the other. Such an approach may be utilized with or without synthetic data. As an example, synthetic data with and/or without noise may be utilized. As an example, a GANAN trained using synthetic data may be utilized to supplement training. As an example, a method can utilize labeled data that can include real and/or synthetic data.

As an example, a cycle-GAN approach can be implemented without demanding a 1-to-1 correspondence between clean data and noisy data. In such an example, a method may be able to learn by using examples of both clean data and examples of noisy data. For example, consider a method that includes using one "clean" survey and one "noisy" survey and using labels from past processing to identify which survey data were clean and which were noisy. The images 1310, 1320, 1330 and 1340 of FIG. 13 correspond to such a method. Above, "clean" data can refer to a level of signal to noise (e.g., SNR), which is greater than that of "noisy" data.

As an example, an approach of adding noise to clean data may provide guidance or decision making for performing one or more surveys and/or tailoring one or more survey parameters. For example, for a marine survey, where weather causes particular waves, such type of noise may be generated as an addition to clean data, which may be synthetic data or actual data that has a high signal to noise. The results can inform whether or not to perform the survey and/or how to perform the survey.

Figure 14:
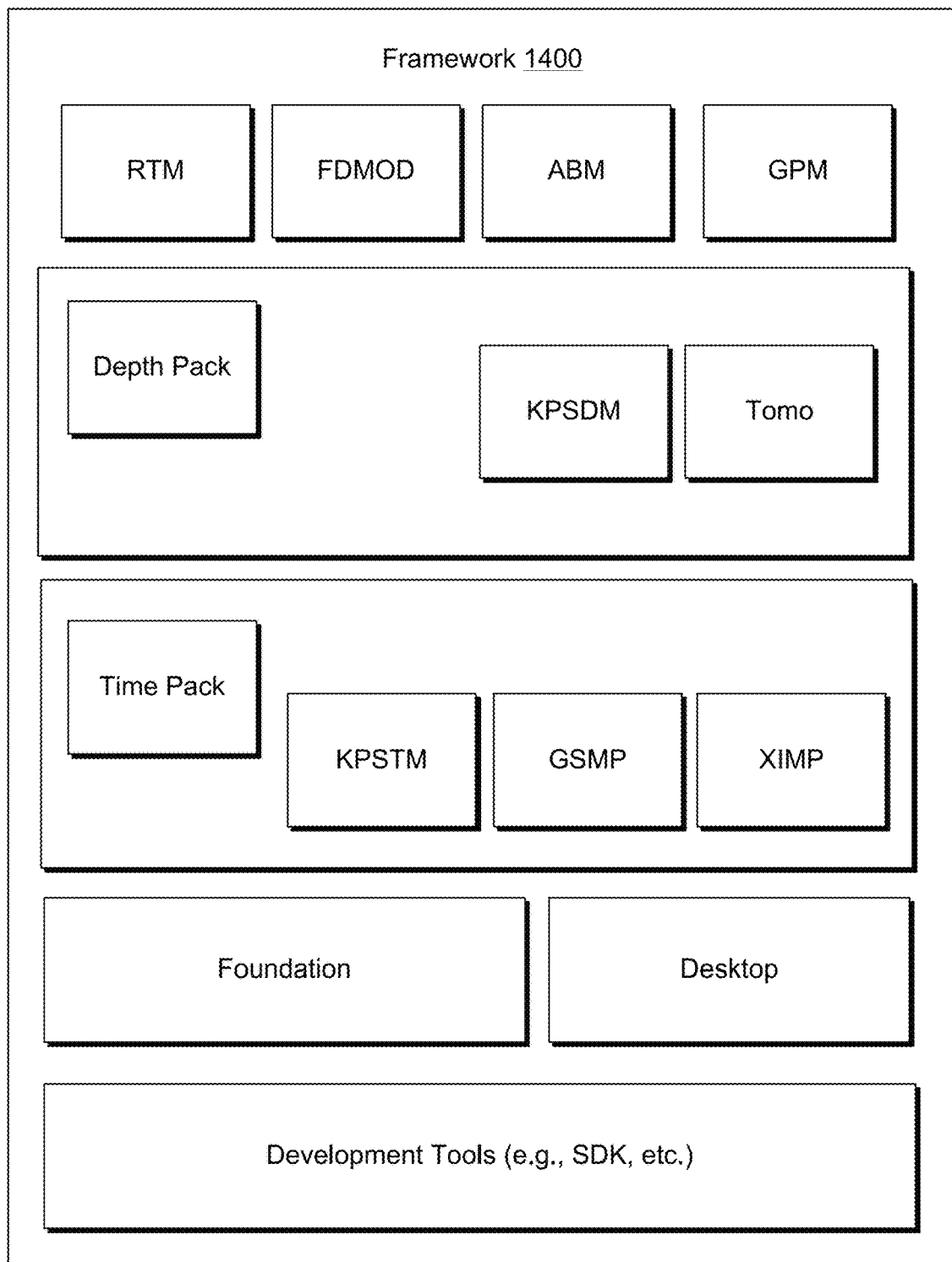
FIG. 14 illustrates an example of a computational framework.

FIG. 14 shows an example of a computational framework 1400 that can include one or more processors and memory, as well as, for example, one or more interfaces. The computational framework of FIG. 14 can include one or more features of the OMEGA framework (Schlumberger Limited, Houston, Tex.), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 14, the computational framework 1400 includes features for RTM, FDMOD, adaptive beam migration (ABM), Gaussian packet migration (GPM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

As an example, the computational framework 1400 can include a GAN-based feature or features. For example, consider a GAN-based component for processing seismic data to attenuate noise, increase resolution via interpolation, etc.

Figure 15:
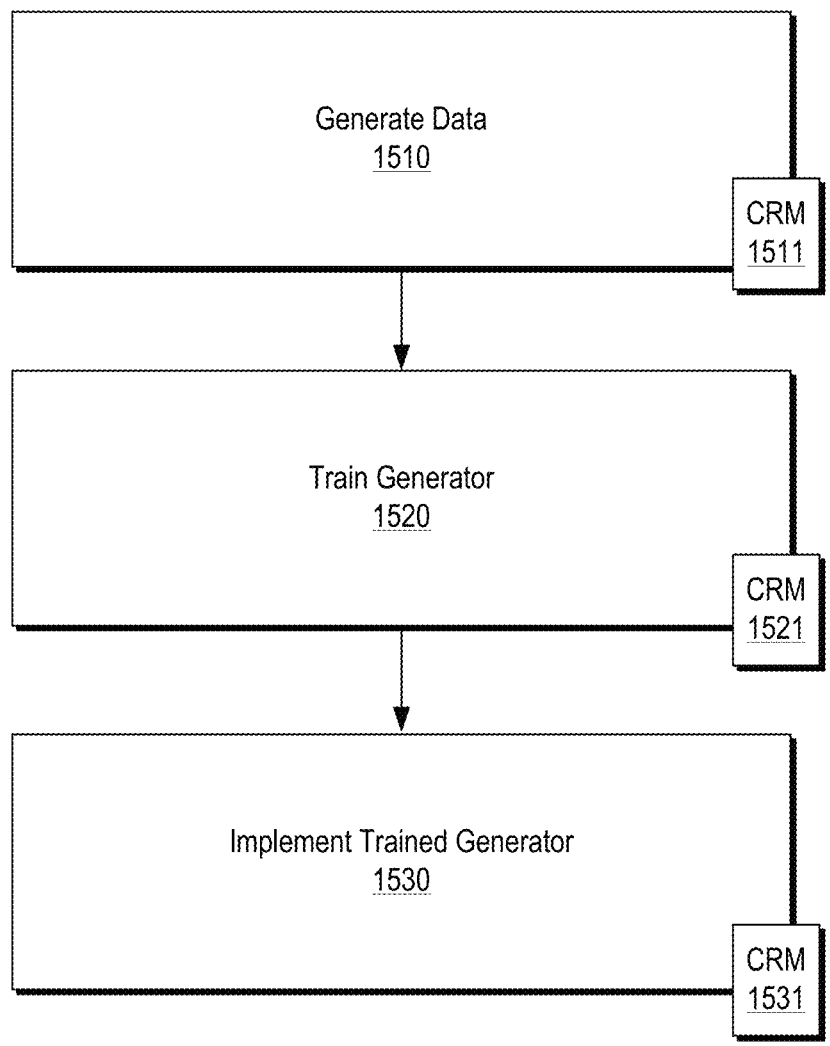
FIG. 15 illustrates an example of a method.

FIG. 15 shows an example of a method 1500 that includes a data generation block 1510 for generating data, a training block 1520 for training a generator via use of a discriminator and a generator where a competitive process can train the generator to output a trained generator, and a data processing block 1530 for processing seismic data utilizing the trained generator to output processed seismic data, which can include one or more of signal and noise.

As to the data generation block 1510, as an example, such data may be generated by a generator. As an example, generated data may be generated that is synthetic using a numerical technique that involves modeling. For example, consider using a finite difference method to generate synthetic data (e.g., consider the FDMOD of the OMEGA framework). As an example, data can be model-based data that is synthetic and/or augmented real data as augmented at least in part with synthetic data. As an example, the TENSORFLOW framework may be utilized for network operations (see, e.g., Equations (1), (2), (3), (4), (5), FIG. 7, FIG. 8, FIG. 12, etc.).

As an example, the method 1500 can include the generation block 1510 for generating seismic data; the training block 1520 for training a generator network utilizing at least a portion of the generated seismic data and a discriminator network; and the output block 1530 for outputting a trained generator network. As an example, such a method can include using the trained generator network to process seismic data, for example, to attenuate noise in seismic data, to interpolate seismic data, etc. As an example, a method can include utilizing a trained generator network to stylize seismic data, for example, to generate seismic data in a "noise attenuated style".

As an example, a method can include generating seismic data using a generator network and training that includes receiving synthetic seismic data and the generated seismic data by a discriminator network. As an example, a method can include generating seismic data using a generator network and training that includes receiving acquired seismic data of a survey and the generated seismic data by a discriminator network. In such an example, the acquired seismic data of the survey can be characterized by a level of signal to noise (e.g., an average SNR, a local SNR, etc.) and/or the acquired seismic data of the survey can be noise attenuated seismic data.

The method 1500 is shown in FIG. 15 in association with various computer-readable media (CRM) blocks 1511, 1521, and 1531. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1500. As an example, a CRM block can be a computer-readable storage medium that is non-transitory, not a carrier wave and not a signal. As an example, such blocks can include instructions that can be stored in memory and can be executable by one or more of processors.

As an example, a method such as the method 1500 of FIG. 15 may be implemented as part of a framework such as the OMEGA framework. As an example, a computation framework can include features that can access a trained generator network, access seismic data and process at least a portion of the seismic data utilizing the trained generator network to output processed data.

As an example, a method can include accessing a trained generator network, as trained via generated seismic data and a discriminator network; receiving seismic data of a survey of a geologic environment; and processing at least a portion of the seismic data utilizing the trained generator network to generate processed data. As an example, such a method can include accessing a trained generator network as, for example, output by the method 1500 of FIG. 15.

As an example, a computer-implemented method of training a generator network for seismic signal detection can include generating seismic data, training a generator network utilizing at least a portion of the generated seismic data and a discriminator network; and outputting a trained generator network. As explained, a discriminator network can be utilized for learning of a distribution such that a generator network can output seismic data that are more "real" (e.g., noise attenuated, higher signal to noise ratio, etc.). As an example, a trained generator network may be utilized for one or more purposes, which can include generating signal and/or generating noise and, for example, identifying signal and/or identifying noise.

As an example, synthetic seismic data may be utilized where a seismic signal to noise ratio is zero. As an example, seismic data may be utilized where a seismic signal to noise ratio is non-zero. In such an example, noise can include a type of seismic signal acquisition noise.

As an example, synthetic seismic data can be generated using a numerical computational technique such as, for example, a finite difference technique, a finite element technique, etc.

As an example, a method can include interpolating seismic data, which can provide for enhanced seismic data (e.g., with respect to an acquisition geometry, an acquisition process, etc.). As an example, seismic image data can be pixel image data corresponding to an acquisition geometry of acquisition equipment and a discriminator can be utilized to operate at a sub-pixel level.

As an example, a method can implement a GAN-based approach for analysis of noise, for example, for conditions under which data were acquired. As an example, such noise can inform an operator or operators as to how acquisition can be improved (e.g., via geometry, via processing, via equipment, etc.). For example, consider an analysis that indicates that a vessel with streamers can reduce noise or otherwise improve a signal to noise ratio by directing the vessel in a certain manner with respect to waves, currents, etc.

As an example, a method can include training a GAN-based network and/or utilizing a trained GAN-based network for seismic data analysis. As an example, such a method may include training using raw seismic data and/or performing an analysis on raw seismic data. Such a method may aim to assess signal as corresponding to physics underlying seismic imaging; rather than aiming to identify a particular structure or object. For example, consider a method that aims to generate seismic data that looks like seismic signals without noise. Such an approach can be a starting point for interpretation of the seismic data to determine/identify structures. For example, a method can provide for enhancing seismic data without "knowing" what structures in the Earth have been imaged or to which structures in the Earth the seismic data pertain. As an example, a method can be implemented in an "object agnostic" manner. As an example, a method may aim to understand what a seismic signal "looks like" and/or what noise "looks like"; rather than what a real world object "looks like".

As an example, a trained network may be utilized for one or more tasks. For example, consider one or more of deghosting and demultiplying seismic data. In such examples, ghosts may be attenuated and/or multiples may be attenuated. As an example, information may be included in ghosts and/or multiples that can be analyzed for one or more purposes.

As mentioned, a method can be utilized for quality control and issue identification, which may pertain to one or more aspects of how a survey is performed and/or equipment utilized in performance of a survey. As mentioned, noise output from a computing system can provide information as to cable integrity (e.g., identification of a damaged fin, a damaged cable, etc.).

As an example, a workflow can include determining one or more petrophysical properties of rocks. As an example, a workflow can include reducing noise from one or more imaging techniques that are based at least in part on seismic survey data that includes multiple source data.

As an example, one or more survey designs can be modelled to ensure quality of a seismic survey. Such an approach can provide for evaluating how well a target zone will be illuminated.

A computational framework may include one or more features of the SIMSOURCE framework. As an example, computational frameworks may be integrated, operatively coupled, etc.

As an example, one or more computational frameworks may be implemented to perform at least a portion of the method 1500 of FIG. 15.

As an example, data can include streamer data that includes data acquired during a turn in a data acquisition path of a vessel.

As an example, a vessel and/or a truck may include computer equipment for implementation of a method such as the method 1500 (e.g., or a part thereof) where such a vessel and/or a truck can acquire seismic data.

As an example, a survey may be a multi-, wide-, or full-azimuth survey. As an example, a survey may be a steamer survey and/or a seabed survey, which may include one or more of ocean-bottom node (OBN) and ocean-bottom cable (OBC).

As an example, a method can include generating seismic data; training a generator network utilizing at least a portion of the generated seismic data and a discriminator network; and outputting a trained generator network.

Such a method can include acquiring seismic data of a survey of a geologic environment and processing at least a portion of the seismic data utilizing the trained generator network to generate processed data. In such an example, the survey can be or include a marine survey. As an example, a marine survey can include a survey path that includes at least one turn.

As an example, processed data can be or include noise attenuated signal data. In such an example, a method can include identifying at least one structural feature of a geologic environment based at least in part on the noise attenuated signal data.

As an example, processed data can be or include noise data. In such an example, a method can include identifying at least one cause of noise based at least in part on the noise data.

As an example, a method can include attenuating noise in seismic data utilizing a trained generator network. As an example, a method can include performing trace interpolation utilizing the trained generator network.

As an example, a method can include utilizing a Wasserstein loss function to reduce risk of mode collapse of a generator network. In such an example, the Wasserstein loss function can include a gradient penalty.

As an example, a discriminator network and a generator network can be components of a generative adversarial network-based architecture.

As an example, generating seismic data can include generating synthetic seismic data.

A system can include a processor; memory operatively coupled to the processor; and processor-executable instructions stored in the memory to instruct the system to: generate seismic data; train a generator network utilizing at least a portion of the generated seismic data and a discriminator network; and output a trained generator network. In such an example, instructions can be included to acquire seismic data of a survey of a geologic environment and to process at least a portion of the seismic data utilizing the trained generator network to generate processed data.

As an example, a system can include a processor; memory operatively coupled to the processor; and processor-executable instructions stored in the memory to instruct the system to: access a trained generator network, as trained via generated seismic data and a discriminator network; receive seismic data of a survey of a geologic environment; and process at least a portion of the seismic data utilizing the trained generator network to generate processed data. In such an example, the system can be part of a survey vessel. As an example, a system can include at least one interface that is operatively coupled to one or more sensors that acquire seismic data. As an example, a system can include instructions to compress generated processed data and transmit compressed generated processed data.

As an example, one or more computer-readable storage media can include processor-executable instructions to instruct a computing system to: access a trained generator network, as trained via generated seismic data and a discriminator network; receive seismic data of a survey of a geologic environment; and process at least a portion of the seismic data utilizing the trained generator network to generate processed data.

As an example, a computing system can be a generative adversarial network seismic data processor.

As an example, a system may include one or more modules, which may be provided to analyze data, control a process, perform a task, perform a workstep, perform a workflow, etc.

Figure 16:
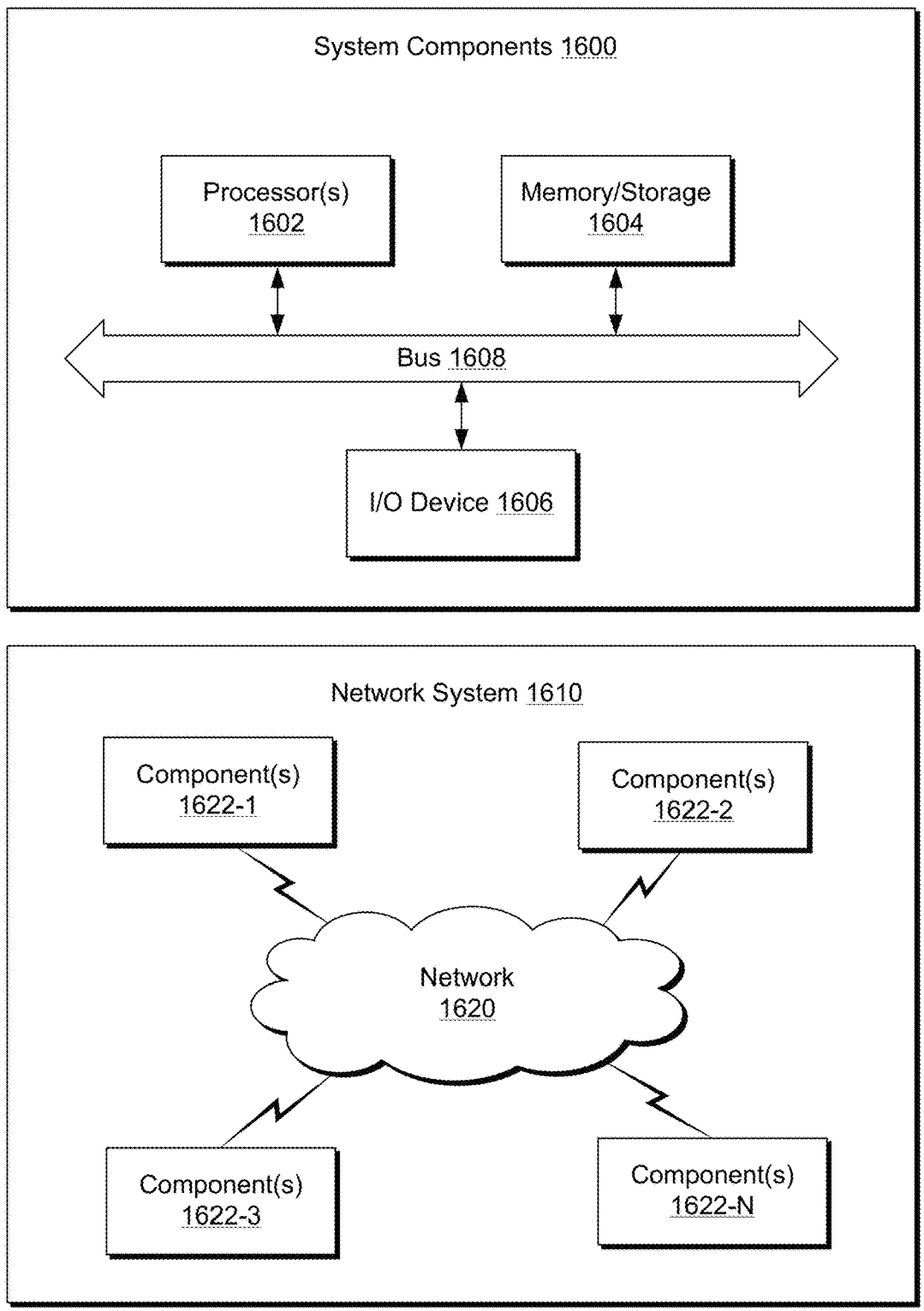
FIG. 16 illustrates example components of a system and a networked system.

FIG. 16 shows components of an example of a computing system 1600 and an example of a networked system 1610, which may be utilized to perform a method, to form a specialized system, etc. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1502 while the component(s) 1622-3 may include memory accessible by the processor(s) 1602. Further, the component(s) 1602-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

BIBLIOGRAPHY

The following documents are incorporated by reference herein.

Gatys et al. (2015), "A Neural Algorithm of Artistic Style," arXiv:1508.06576.
Goodfellow et al. (2014), "Generative Adversarial Networks," arXiv:1406.2661.
He et al. (2015), "Deep Residual Learning for Image Recognition," arXiv:1512.03385.
Gulrajani et al. (2017), "Improved Training of Wasserstein GANs", arXiv:1704.00028.
Isola et al. (2016), "Image-to-Image Translation with Conditional Adversarial Networks," arXiv:1611.07004.
LeCun, "Session with Yann LeCun." Quora—A place to share knowledge and better understand the world", 28 Jul. 2016 (accessed 13 Feb. 2018).
Ledig et al. (2017), "Photo-Realistic Single Image Super-Resolution Using a Generative Adversarial Network," arXiv:1609.04802.
Arjovsky et al. (2017), "Wasserstein GAN," arXiv: 1701.07875.
Radford et al. (2015), "Unsupervised Representation Learning with Deep Convolutional Generative Adversarial Networks," arXiv:1511.06434v2.
Ronneberger et al. (2015), "U-Net: Convolutional Networks for Biomedical Image Segmentation," arXiv:1505.04597.
Shi et al. (2016), "Real-Time Single Image and Video Super-Resolution Using an Efficient Sub-Pixel Convolutional Neural Network," arXiv:1609.05158.
Yang et al. (2018), "Application of optimal transport and the quadratic Wasserstein metric to full-waveform inversion," GEOPHYSICS, 83(1), R43-R62.
Zhu et al., "Unpaired Image-to-Image Translation using Cycle-Consistent Adversarial Networks," arXiv: 1703.10593v6 [cs.CV], https://arxiv.org/abs/1703.10593 (submitted on 30 Mar. 2017 (v1), revised 15 Nov. 2018 (v6)).

What is claimed is:

1. A method comprising:
generating seismic data, wherein generating seismic data comprises generating seismic data using a generator network;
training the generator network utilizing at least a portion of the generated seismic data and a discriminator network, wherein training comprises receiving synthetic seismic data and the generated seismic data by the discriminator network; and
outputting a trained generator network.

2. The method of claim 1 comprising acquiring seismic data of a survey of a geologic environment and processing at least a portion of the seismic data utilizing the trained generator network to generate processed data.

3. The method of claim 2 wherein the survey comprises a marine survey.

4. The method of claim 3 wherein the marine survey comprises a survey path that includes at least one turn.

5. The method of claim 2 wherein the processed data comprise noise attenuated signal data.

6. The method of claim 5 comprising identifying at least one structural feature of the geologic environment based at least in part on the noise attenuated signal data.

7. The method of claim 2 wherein the processed data comprise noise data.

8. The method of claim 7 comprising identifying at least one cause of noise based at least in part on the noise data.

9. The method of claim 1 wherein training comprises receiving acquired seismic data of a survey.

10. The method of claim 9 wherein the acquired seismic data of the survey comprises a level of signal to noise.

11. The method of claim 9 wherein the acquired seismic data of the survey comprises noise attenuated seismic data.

12. The method of claim 1 comprising utilizing a Wasserstein loss function to reduce risk of mode collapse of the generator network.

13. The method of claim 12 wherein the Wasserstein loss function comprises a gradient penalty.

14. The method of claim 1 further comprising attenuating noise in seismic data utilizing the trained generator network.

15. The method of claim 1 further comprising performing trace interpolation utilizing the trained generator network.

16. The method of claim 1 wherein the discriminator network and the generator network comprise components of a generative adversarial network-based architecture.

17. The method of claim 1 wherein the discriminator network and the generator network comprise components of a cyclic generative adversarial network-based architecture.

18. A system comprising:
a processor;
memory operatively coupled to the processor; and
processor-executable instructions stored in the memory to instruct the system to:
generate seismic data, wherein to generate seismic data comprises generation of seismic data using a generator network;
train the generator network utilizing at least a portion of the generated seismic data and a discriminator network, wherein to train comprises reception of synthetic seismic data and the generated seismic data by the discriminator network; and
output a trained generator network.

19. One or more computer-readable storage media comprising processor-executable instructions to instruct a computing system to:
generate seismic data, wherein to generate seismic data comprises generation of seismic data using a generator network;
train the generator network utilizing at least a portion of the generated seismic data and a discriminator network, wherein to train comprises reception of synthetic seismic data and the generated seismic data by the discriminator network; and
output a trained generator network.

20. A method comprising:
generating seismic data;
training a generator network utilizing at least a portion of the generated seismic data and a discriminator network;
outputting a trained generator network; and
performing trace interpolation utilizing the trained generator network.

21. A method comprising:
generating seismic data;
training a generator network utilizing at least a portion of the generated seismic data and a discriminator network;
outputting a trained generator network;
acquiring seismic data of a survey of a geologic environment and processing at least a portion of the seismic data utilizing the trained generator network to generate processed data, wherein the processed data comprise noise attenuated signal data; and
identifying at least one structural feature of the geologic environment based at least in part on the noise attenuated signal data.

* * * * *